United States Patent
Watanabe et al.

(10) Patent No.: US 11,525,802 B2
(45) Date of Patent: Dec. 13, 2022

(54) GAS SENSOR AND SENSOR ELEMENT

(71) Applicant: NGK INSULATORS, LTD., Aichi (JP)

(72) Inventors: Yusuke Watanabe, Nagoya (JP); Shiho Iwai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 280 days.

(21) Appl. No.: 16/819,925

(22) Filed: Mar. 16, 2020

(65) Prior Publication Data

US 2020/0309729 A1 Oct. 1, 2020

(30) Foreign Application Priority Data

Mar. 27, 2019 (JP) .............................. JP2019-060604

(51) Int. Cl.
*G01N 27/409* (2006.01)
*G01N 27/407* (2006.01)
*G01N 27/419* (2006.01)
*G01N 27/30* (2006.01)
*G01N 27/41* (2006.01)

(52) U.S. Cl.
CPC ......... *G01N 27/409* (2013.01); *G01N 27/301* (2013.01); *G01N 27/4071* (2013.01); *G01N 27/41* (2013.01); *G01N 27/419* (2013.01)

(58) Field of Classification Search
CPC ............. G01N 27/409; G01N 27/301; G01N 27/4071; G01N 27/419; G01N 27/4076; G01N 27/406–41; G01N 33/0004–0075
See application file for complete search history.

(56) References Cited

U.S. PATENT DOCUMENTS 6,036,842 A * 3/2000 Kato .................... G01N 27/417
204/425
6,315,881 B1 * 11/2001 Fu ............................. C03C 4/18
204/426

(Continued)

FOREIGN PATENT DOCUMENTS

JP 2015-200643 A 11/2015

OTHER PUBLICATIONS

U.S. Appl. No. 16/819,921, filed Mar. 16, 2020.

*Primary Examiner* — Joshua L Allen
(74) *Attorney, Agent, or Firm* — Mattingly & Malur, PC

(57) ABSTRACT

A gas sensor includes a sensor element, a detection device, a reference gas regulating device. The sensor element includes an element body having disposed therein a measurement-object gas flow section, a measurement-object-gas-side electrode disposed in or out of the element body, a reference electrode disposed within the element body, and a reference gas introducing section that allows a reference gas to be introduced thereinto and to flow therethrough to the reference electrode. The reference gas regulating device allows an oxygen pump-in current to flow between the reference electrode and the measurement-object-gas-side electrode to pump oxygen into around the reference electrode from around the measurement-object-gas-side electrode. A ratio R1/R2 of a reaction resistance R1 of the reference electrode to a diffusion resistance R2 of the reference gas introducing section is greater than or equal to 0.1 and less than or equal to 2.0.

11 Claims, 6 Drawing Sheets

(56) References Cited

U.S. PATENT DOCUMENTS

| | | | | |
|---|---|---|---|---|
| 6,485,622 B1* | 11/2002 | Fu | .................. | G01N 27/4073 |
| | | | | 429/491 |
| 9,863,849 B2* | 1/2018 | Schneider | ............ | G01N 33/007 |
| 2010/0236925 A1* | 9/2010 | Uchikawa | ............... | C04B 38/02 |
| | | | | 428/317.9 |
| 2015/0253282 A1* | 9/2015 | Satou | ................ | G01N 27/4075 |
| | | | | 204/429 |
| 2015/0276659 A1* | 10/2015 | Sekiya | ............... | G01N 27/4071 |
| | | | | 204/416 |
| 2017/0167994 A1* | 6/2017 | Okamoto | ........... | G01N 27/4175 |
| 2018/0059046 A1* | 3/2018 | Okamoto | ........... | G01N 27/4067 |

* cited by examiner

GAS SENSOR AND SENSOR ELEMENT

The present application claims priority to Japanese Patent Application No. 2019-060604, filed on Mar. 27, 2019, the entire contents of which are incorporated herein by reference.

BACKGROUND OF THE INVENTION

1. Field of the Invention

The present invention relates to a gas sensor and a sensor element.

2. Description of the Related Art

Gas sensors are known in the related art for detecting a specific gas concentration such as NOx in a measurement-object gas such as an exhaust gas of an automobile. For example, PTL 1 describes a gas sensor. The gas sensor includes a layered body formed by stacking a plurality of oxygen-ion-conductive solid electrolyte layers, a reference electrode which is formed within the layered body and into which a reference gas (e.g., air) is introduced via a reference gas introducing space, a measurement electrode disposed in a measurement-object gas flow section within the layered body, and a measurement-object-gas-side electrode disposed in a portion of the layered body that is exposed to a measurement-object gas. The gas sensor detects a specific gas concentration in the measurement-object gas on the basis of an electromotive force generated between the reference electrode and the measurement electrode. The gas sensor further includes a reference gas regulating device that causes a control current to flow between the reference electrode and the measurement-object-gas-side electrode to pump oxygen into around the reference electrode. PTL 1 describes the reference gas regulating device pumping oxygen into around the reference electrode to compensate for a decrease in oxygen concentration if the oxygen concentration in the reference gas around the reference electrode is decreased, thereby suppressing a reduction in the detection accuracy of the specific gas concentration. Note that the oxygen concentration in the reference gas around the reference electrode is decreased, for example, when the measurement-object gas slightly enters the reference gas introducing space.

CITATION LIST

Patent Literature

PTL 1: JP 2015-200643 A

SUMMARY OF THE INVENTION

When oxygen is pumped into around the reference electrode, the amount of pumping-in of oxygen may be excessively large or small in some cases. In other cases, an excessive amount of oxygen may be accumulated around the reference electrode, or the oxygen around the reference electrode may be excessively released to the outside. This makes it difficult to maintain the oxygen concentration around the reference electrode at an appropriate value, which may result in a reduction in the detection accuracy of the specific gas concentration in some cases.

The present invention has been made to address the problems described above, and it is a main object of the present invention to suppress a reduction in the detection accuracy of the specific gas concentration.

To achieve the main object described above, the present invention is configured as follows.

The present invention provides a gas sensor for detecting a specific gas concentration in a measurement-object gas, the gas sensor including:

a sensor element including an element body including an oxygen-ion-conductive solid electrolyte layer, the element body having disposed therein a measurement-object gas flow section that allows the measurement-object gas to be introduced thereinto and to flow therethrough, a measurement electrode disposed in the measurement-object gas flow section, a measurement-object-gas-side electrode disposed in or out of the element body so as to come into contact with the measurement-object gas, a reference electrode disposed within the element body, and a reference gas introducing section that allows a reference gas to be introduced thereinto and to flow therethrough to the reference electrode, the reference gas being used as a reference to detect the specific gas concentration in the measurement-object gas;

a detection device that detects the specific gas concentration in the measurement-object gas on the basis of a voltage between the reference electrode and the measurement electrode; and a reference gas regulating device that allows an oxygen pump-in current to flow between the reference electrode and the measurement-object-gas-side electrode to pump oxygen into around the reference electrode from around the measurement-object-gas-side electrode, wherein a ratio $R1/R2$ of a reaction resistance $R1$ of the reference electrode to a diffusion resistance $R2$ of the reference gas introducing section is greater than or equal to 0.1 and less than or equal to 2.0.

The gas sensor causes an oxygen pump-in current to flow between the reference electrode and the measurement-object-gas-side electrode, thereby pumping oxygen into around the reference electrode. This can compensate for a decrease in oxygen concentration around the reference electrode, for example, when the measurement-object gas enters the reference gas introducing section. In addition, the ratio $R1/R2$ of the reaction resistance $R1$ of the reference electrode to the diffusion resistance $R2$ of the reference gas introducing section is greater than or equal to 0.1 and less than or equal to 2.0. The reaction resistance $R1$ of the reference electrode has a correlation with the amount of oxygen to be pumped into around the reference electrode from around the measurement-object-gas-side electrode. The diffusion resistance $R2$ of the reference gas introducing purport section has a correlation with the likelihood of the oxygen around the reference electrode being released to the outside. Setting the ratio $R1/R2$ to be greater than or equal to 0.1 and less than or equal to 2.0 can maintain the oxygen concentration around the reference electrode at an appropriate value and can suppress a reduction in the detection accuracy of the specific gas concentration.

In the gas sensor according to the present invention, the ratio $R1/R2$ may be greater than or equal to 0.3 and less than or equal to 1.0. This enhances the effect of maintaining the oxygen concentration around the reference electrode at an appropriate value. The ratio $R1/R2$ may be greater than or equal to 0.4.

In the gas sensor according to the present invention, the reaction resistance R1 may be greater than or equal to 100Ω and less than or equal to 1000Ω. This makes it likely that the ratio R1/R2 is greater than or equal to 0.1 and less than or equal to 2.0.

In the gas sensor according to the present invention, the diffusion resistance R2 may be greater than or equal to 300Ω and less than or equal to 1000Ω. This makes it likely that the ratio R1/R2 is greater than or equal to 0.1 and less than or equal to 2.0.

In the gas sensor according to the present invention, the reference electrode may have an area S1 of greater than or equal to 1.0 mm$^2$. This makes it likely that the ratio R1/R2 is greater than or equal to 0.1.

In the gas sensor according to the present invention, the reference electrode may be a porous body having a porosity P1 of greater than or equal to 10% and less than or equal to 25%, and the reference gas introducing section may include a porous reference gas introducing layer having a porosity P2 of greater than or equal to 20% and less than or equal to 50% and satisfying P1<P2. This makes it likely that the ratio R1/R2 is greater than or equal to 0.1 and less than or equal to 2.0.

In the gas sensor according to the present invention, the element body may have a longitudinal direction, the reference gas introducing section may include a porous reference gas introducing layer, a thickness H2 of the reference gas introducing layer may be larger than a thickness H1 of the reference electrode, and a width W2 of the reference gas introducing layer may be larger than a width W1 of the reference electrode, the width W1 and the width W2 extending in a width direction that is a direction perpendicular to the longitudinal direction. This makes it likely that the ratio R1/R2 is greater than or equal to 0.1 and less than or equal to 2.0.

In the gas sensor according to the present invention, the reference gas introducing section may include a porous reference gas introducing layer, the reference electrode may have a thickness H1 of greater than or equal to 10 μm and less than or equal to 20 μm, and the reference gas introducing layer may have a thickness H2 of greater than or equal to 15 μm and less than or equal to 40 μm. This makes it likely that the ratio R1/R2 is greater than or equal to 0.1 and less than or equal to 2.0.

In the gas sensor according to the present invention, the element body may have a longitudinal direction, the reference gas introducing section may include a porous reference gas introducing layer, and the reference electrode may have a width W1 of greater than or equal to 0.6 mm and less than or equal to 2.5 mm, and the reference gas introducing layer may have a width W2 of greater than or equal to 1.5 mm and less than or equal to 3.0 mm, the width W1 and the width W2 extending in a width direction that is a direction perpendicular to the longitudinal direction. This makes it likely that the ratio R1/R2 is greater than or equal to 0.1 and less than or equal to 2.0.

In the gas sensor according to the present invention, the sensor element may further include a measurement voltage detection unit that detects a measurement voltage that is the voltage between the reference electrode and the measurement electrode, a measurement pump cell including the measurement electrode and an outer measurement electrode disposed on an outer side of the element body so as to come into contact with the measurement-object gas, and a reference-gas regulating pump cell including the reference electrode and the measurement-object-gas-side electrode, the detection device may include the measurement pump cell, and a measurement pump cell controller that controls the measurement pump cell, the measurement pump cell controller may control the measurement pump cell on the basis of the measurement voltage so that the measurement voltage becomes a target voltage, obtain a measurement pump current that flows when the measurement pump cell pumps out oxygen, which is produced around the measurement electrode from the specific gas, from around the measurement electrode to around the outer measurement electrode in accordance with the control, and detect the specific gas concentration in the measurement-object gas on the basis of the measurement pump current, or may control the measurement pump cell so that the measurement pump current becomes a target current, and detect the specific gas concentration in the measurement-object gas on the basis of the measurement voltage obtained when the control is performed, and the reference gas regulating device may include the reference-gas regulating pump cell, and a reference-gas regulating pump cell controller that allows the oxygen pump-in current to flow to the reference-gas regulating pump cell.

In the gas sensor of the present invention, the reference gas regulating device may apply a control voltage between the reference electrode and the measurement-object-gas-side electrode to pump oxygen into around the reference electrode, the control voltage being repeatedly turned on and off, and the detection device may detect the specific gas concentration in the measurement-object gas on the basis of a voltage between the reference electrode and the measurement electrode during a second period among a first period and the second period, the first period being a period which begins in response to turning on of the control voltage and during which a potential difference between the reference electrode and the measurement-object-gas-side electrode is large, the second period being a period which begins in response to turning off of the control voltage and in which the potential difference has fallen relative to the potential difference during the first period. In this case, the reference-gas regulating pump cell controller may apply the control voltage to the reference-gas regulating pump cell. The measurement pump cell controller may detect the specific gas concentration in the measurement-object gas on the basis of the measurement pump current obtained when the measurement pump cell is controlled so that the measurement voltage obtained during the second period becomes the target voltage. Alternatively, the measurement pump cell controller may control the measurement pump cell so that the measurement pump current becomes the target current, and detect the specific gas concentration in the measurement-object gas on the basis of the measurement voltage obtained during the second period after the control is performed.

A sensor element according to the present invention is a sensor element for detecting a specific gas concentration in a measurement-object gas, the sensor element including:

an element body including an oxygen-ion-conductive solid electrolyte layer, the element body having disposed therein a measurement-object gas flow section that allows the measurement-object gas to be introduced thereinto and to flow therethrough;

a measurement electrode disposed in the measurement-object gas flow section;

a measurement-object-gas-side electrode disposed in or out of the element body so as to come into contact with the measurement-object gas;

a reference electrode disposed within the element body; and a reference gas introducing section that allows a reference gas to be introduced thereinto and to flow therethrough to the reference electrode, the reference gas being used as a reference to detect the specific gas concentration in the measurement-object gas, wherein a ratio R1/R2 of a reaction resistance R1 of the reference electrode to a diffusion resistance R2 of the reference gas introducing section is greater than or equal to 0.1 and less than or equal to 2.0.

The sensor element may use, for example, the detection device and the reference gas regulating device described above in combination to detect the specific gas concentration. In the sensor element, since the ratio R1/R2 is greater than or equal to 0.1 and less than or equal to 2.0, the use of the sensor element can suppress a reduction in the detection accuracy of the specific gas concentration. The sensor element according to the present invention may employ any of the various configurations of the gas sensor of the present invention described above.

DETAILED DESCRIPTION OF THE INVENTION

Figure 1:
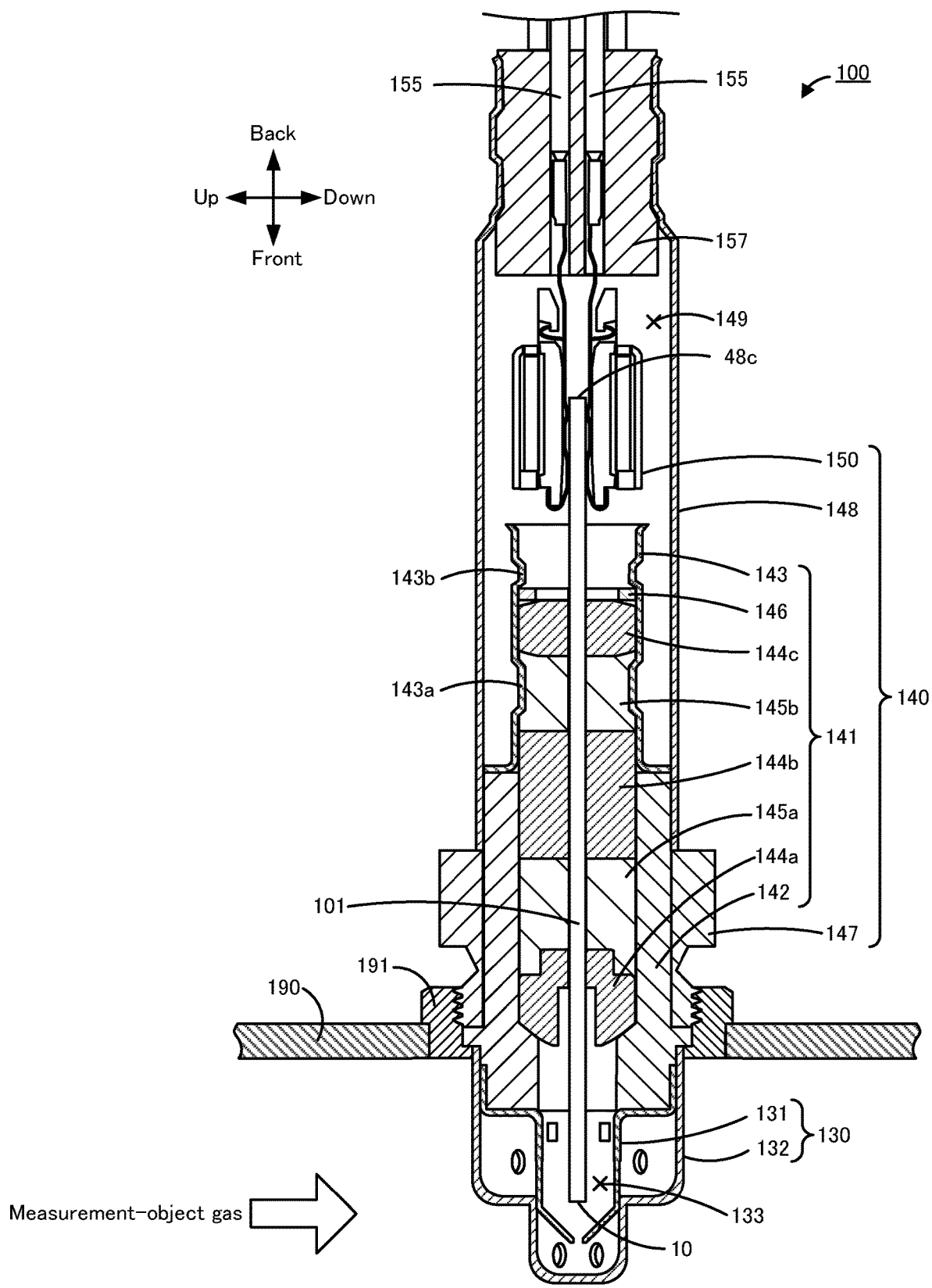
FIG. 1 is a longitudinal sectional view of a gas sensor 100.
Figure 2:
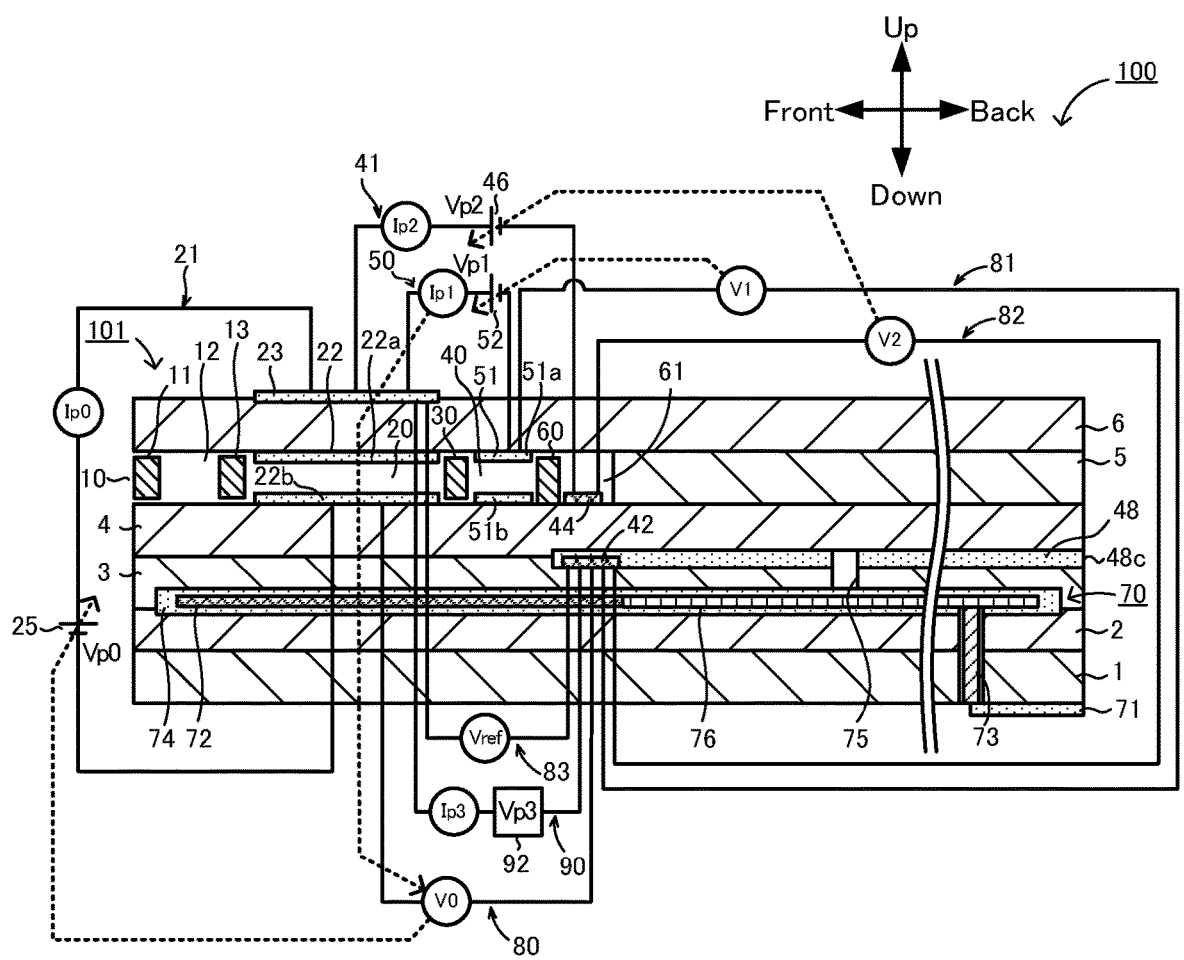
FIG. 2 is a schematic sectional view schematically illustrating an example configuration of a sensor element 101.

Next, an embodiment of the present invention will be described with reference to the drawings. FIG. 1 is a longitudinal sectional view of a gas sensor 100 according to an embodiment of the present invention. FIG. 2 is a schematic sectional view schematically illustrating an example configuration of a sensor element 101 included in the gas sensor 100. The sensor element 101 has a long, rectangular parallelepiped shape. The longitudinal direction of the sensor element 101 (left-right direction in FIG. 2) is represented as a front-rear direction, and the thickness direction of the sensor element 101 (up-down direction in FIG. 2) is represented as an up-down direction. The width direction of the sensor element 101 (direction perpendicular to the front-rear direction and the up-down direction) is represented as a left-right direction.

As illustrated in FIG. 1, the gas sensor 100 includes the sensor element 101, a protective cover 130 that protects the front end side of the sensor element 101, and a sensor assembly 140. The sensor assembly 140 includes a connector 150 having continuity with the sensor element 101. As illustrated in the drawing, the gas sensor 100 is attached to, for example, a pipe 190, such as an exhaust gas pipe of a vehicle, and is used to measure the concentration of a specific gas such as NOx or $O_2$ contained in an exhaust gas that is a measurement-object gas. In this embodiment, the gas sensor 100 is configured to measure NOx concentration as specific gas concentration.

The protective cover 130 includes a bottomed cylindrical inner protective cover 131 that covers a front end of the sensor element 101, and a bottomed cylindrical outer protective cover 132 that covers the inner protective cover 131. The inner protective cover 131 and the outer protective cover 132 have formed therein a plurality of holes through which the measurement-object gas flows into the protective cover 130. A sensor element chamber 133 is formed as a space surrounded by the inner protective cover 131. The front end of the sensor element 101 is arranged in the sensor element chamber 133.

The sensor assembly 140 includes an element sealing body 141 that seals the sensor element 101 in a fixed manner, a nut 147 attached to the element sealing body 141, an outer cylinder 148, and the connector 150. The connector 150 is in contact with connector electrodes (not illustrated) (only a heater connector electrode 71, which will be described below, is illustrated in FIG. 2) formed on surfaces (upper and lower surfaces) at a rear end of the sensor element 101 and is electrically connected to the connector electrodes.

The element sealing body 141 includes a cylindrical main metal fitting 142, a cylindrical inner cylinder 143 coaxially welded to the main metal fitting 142 in a fixed manner, ceramic supporters 144a to 144c sealed in through holes inside the main metal fitting 142 and the inner cylinder 143, green compacts 145a and 145b, and a metal ring 146. The sensor element 101 is located along the center axis of the element sealing body 141 in such a manner as to extend through the element sealing body 141 in the front-rear direction. The inner cylinder 143 has a reduced diameter portion 143a for pressing the green compact 145b in a direction toward the center axis of the inner cylinder 143, and a reduced diameter portion 143b for pressing the ceramic supporters 144a to 144c and the green compacts 145a and 145b to the front via the metal ring 146. The pressing forces from the reduced diameter portions 143a and 143b compress the green compacts 145a and 145b between the sensor element 101 and the set of the main metal fitting 142 and the inner cylinder 143. Accordingly, the green compacts 145a and 145b perform sealing between the sensor element chamber 133 in the protective cover 130 and a space 149 in the outer cylinder 148, and fix the sensor element 101.

The nut 147 is coaxially fixed to the main metal fitting 142, and has a male threaded portion formed on an outer peripheral surface thereof. The male threaded portion of the nut 147 is inserted into a fixing member 191 welded to the pipe 190. The fixing member 191 has a female threaded portion on an inner peripheral surface thereof. Accordingly, the gas sensor 100 is fixed to the pipe 190 in such a manner that a portion of the gas sensor 100 corresponding to the front end of the sensor element 101 and the protective cover 130 projects into the pipe 190.

The outer cylinder 148 surrounds the inner cylinder 143, the sensor element 101, and the connector 150. A plurality of lead wires 155, which are connected to the connector 150, are drawn out from a rear end of the outer cylinder 148. The lead wires 155 have continuity with electrodes (described below) of the sensor element 101 via the connector 150. A gap between the outer cylinder 148 and the lead wires 155 is sealed with a rubber stopper 157. The space 149 in the outer cylinder 148 is filled with a reference gas (in this embodiment, air). The rear end of the sensor element 101 is arranged in the space 149.

The sensor element 101 is an element including a layered body having six layers, each of which is formed of an oxygen-ion-conductive solid electrolyte layer such as a zirconia ($ZrO_2$) layer. The six layers include a first substrate layer 1, a second substrate layer 2, a third substrate layer 3, a first solid electrolyte layer 4, a spacer layer 5, and a second solid electrolyte layer 6, which are stacked in the stated order from bottom to top in the drawing. The solid electrolyte forming the six layers is dense and gas-tight. The sensor element 101 is manufactured by, for example, after performing predetermined processing and circuit pattern printing on ceramic green sheets, each corresponding to one of the layers, stacking the ceramic green sheets, firing the stacked ceramic green sheets, and combining the fired ceramic green sheets together to form a single unit.

At one end of the sensor element 101 (in the left-hand portion of FIG. 2), a gas inlet 10, a first diffusion control section 11, a buffer space 12, a second diffusion control section 13, a first internal cavity 20, a third diffusion control section 30, a second internal cavity 40, a fourth diffusion control section 60, and a third internal cavity 61 are formed adjacent and communicate in the stated order between a lower surface of the second solid electrolyte layer 6 and an upper surface of the first solid electrolyte layer 4.

The gas inlet 10, the buffer space 12, the first internal cavity 20, the second internal cavity 40, and the third internal cavity 61 are internal spaces of the sensor element 101, which are formed by hollowing a portion of the spacer layer 5, with the tops thereof defined by the lower surface of the second solid electrolyte layer 6, the bottoms thereof defined by the upper surface of the first solid electrolyte layer 4, and the sides thereof defined by the side surfaces of the spacer layer 5.

The first diffusion control section 11, the second diffusion control section 13, and the third diffusion control section 30 are each provided as two horizontally long slits (whose openings have a longitudinal direction along a direction perpendicular to the drawing). The fourth diffusion control section 60 is provided as a single horizontally long slit (whose opening has a longitudinal direction along a direction perpendicular to the drawing), which is formed as a gap from the lower surface of the second solid electrolyte layer 6. Note that the portion from the gas inlet 10 up to the third internal cavity 61 is also referred to as a measurement-object gas flow section.

An air introducing layer 48 is disposed between an upper surface of the third substrate layer 3 and a lower surface of the first solid electrolyte layer 4. The air introducing layer 48 is, for example, porous and composed of ceramics such as alumina. A rear end surface of the air introducing layer 48 is an inlet 48c, and the inlet 48c is exposed on a rear end surface of the sensor element 101. The inlet 48c is exposed in the space 149 illustrated in FIG. 1 (see FIG. 1). A reference gas used to measure NOx concentration is introduced into the air introducing layer 48 through the inlet 48c. In this embodiment, the reference gas is air (atmosphere in the space 149 illustrated in FIG. 1). The air introducing layer 48 is formed so as to cover a reference electrode 42. The air introducing layer 48 applies a predetermined diffusion resistance to the reference gas introduced through the inlet 48c and introduces the reference gas into the reference electrode 42.

The reference electrode 42 is an electrode formed between the upper surface of the third substrate layer 3 and the first solid electrolyte layer 4, and is surrounded by the air introducing layer 48, as described above. The reference electrode 42 is formed directly on the upper surface of the third substrate layer 3 and is covered with the air introducing layer 48, except for a portion in contact with the upper surface of the third substrate layer 3. At least a portion of the reference electrode 42 may be covered with the air introducing layer 48. As described below, the reference electrode 42 can be used to measure the oxygen concentrations (oxygen partial pressures) in the first internal cavity 20, the second internal cavity 40, and the third internal cavity 61. The reference electrode 42 is formed as a porous cermet electrode (e.g., a cermet electrode composed of Pt and $ZrO_2$).

In the measurement-object gas flow section, the gas inlet 10 is a portion open to an external space such that the measurement-object gas is taken into the sensor element 101 from the external space through the gas inlet 10. The first diffusion control section 11 is a portion that applies a predetermined diffusion resistance to the measurement-object gas taken through the gas inlet 10. The buffer space 12 is a space provided to guide the measurement-object gas introduced from the first diffusion control section 11 to the second diffusion control section 13. The second diffusion control section 13 is a portion that applies a predetermined diffusion resistance to the measurement-object gas to be introduced into the first internal cavity 20 from the buffer space 12. When the measurement-object gas is introduced into the first internal cavity 20 from outside the sensor element 101, the measurement-object gas, which is rapidly taken into the sensor element 101 through the gas inlet 10 due to changes in the pressure of the measurement-object gas in the external space (pulsations in exhaust pressure when the measurement-object gas is an exhaust gas of an automobile), is not directly introduced into the first internal cavity 20, but is introduced into the first internal cavity 20 after the changes in the pressure of the measurement-object gas have been cancelled through the first diffusion control section 11, the buffer space 12, and the second diffusion control section 13. Consequently, the changes in the pressure of the measurement-object gas to be introduced into the first internal cavity 20 are almost negligible. The first internal cavity 20 is provided as a space for adjusting the oxygen partial pressure in the measurement-object gas introduced through the second diffusion control section 13. The oxygen partial pressure is adjusted by the operation of a main pump cell 21.

The main pump cell 21 is an electrochemical pump cell including an inner pump electrode 22 having a ceiling electrode portion 22a disposed over substantially an entire lower surface of a portion of the second solid electrolyte layer 6 that faces the first internal cavity 20, an outer pump electrode 23 disposed in a region corresponding to the ceiling electrode portion 22a on an upper surface of the second solid electrolyte layer 6 in such a manner as to be exposed to an external space (the sensor element chamber 133 in FIG. 1), and a portion of the second solid electrolyte layer 6 that is held between the electrodes 22 and 23.

The inner pump electrode 22 is formed across the upper and lower solid electrolyte layers defining the first internal cavity 20 (i.e., the second solid electrolyte layer 6 and the first solid electrolyte layer 4) and the spacer layer 5 forming the sidewall. Specifically, the ceiling electrode portion 22a is formed on the lower surface of the second solid electrolyte layer 6, which forms a ceiling surface of the first internal cavity 20. A bottom electrode portion 22b is formed directly on the upper surface of the first solid electrolyte layer 4, which forms a bottom surface of the first internal cavity 20. Side electrode portions (not illustrated) are formed on sidewall surfaces (inner surfaces) of the spacer layer 5, which form both sidewall portions of the first internal cavity 20, so as to connect the ceiling electrode portion 22a and the bottom electrode portion 22b to each other. The inner pump electrode 22 is thus disposed to have a tunnel structure in the portion where the side electrode portions are disposed.

The inner pump electrode 22 and the outer pump electrode 23 are each formed as a porous cermet electrode (e.g., a cermet electrode composed of Pt and $ZrO_2$ containing 1% Au). The inner pump electrode 22, which comes into contact with the measurement-object gas, is formed of a material having lowered reduction ability for the NOx component in the measurement-object gas.

In the main pump cell 21, a desired pump voltage Vp0 is applied between the inner pump electrode 22 and the outer pump electrode 23 to cause a pump current Ip0 to flow between the inner pump electrode 22 and the outer pump electrode 23 in the positive direction or the negative direction. Accordingly, the main pump cell 21 is capable of pumping oxygen out of the first internal cavity 20 to the external space or pumping oxygen into the first internal cavity 20 from the external space.

To detect the oxygen concentration (oxygen partial pressure) in the atmosphere in the first internal cavity 20, the inner pump electrode 22, the second solid electrolyte layer 6, the spacer layer 5, the first solid electrolyte layer 4, the third substrate layer 3, and the reference electrode 42 form an electrochemical sensor cell, that is, a main-pump-control oxygen-partial-pressure detection sensor cell 80.

An electromotive force V0 in the main-pump-control oxygen-partial-pressure detection sensor cell 80 is measured to determine the oxygen concentration (oxygen partial pressure) in the first internal cavity 20. In addition, the pump current Ip0 is controlled by performing feedback control of the pump voltage Vp0 of a variable power supply 25 so that the electromotive force V0 is kept constant. This can keep the oxygen concentration in the first internal cavity 20 at a predetermined constant value.

The third diffusion control section 30 is a portion that applies a predetermined diffusion resistance to the measurement-object gas whose oxygen concentration (oxygen partial pressure) is controlled in the first internal cavity 20 by the operation of the main pump cell 21 to guide the measurement-object gas into the second internal cavity 40.

The second internal cavity 40 is provided as a space for, after the adjustment of the oxygen concentration (oxygen partial pressure) in the first internal cavity 20 in advance, further adjusting, using an auxiliary pump cell 50, the oxygen partial pressure of the measurement-object gas introduced through the third diffusion control section 30. This can keep the oxygen concentration in the second internal cavity 40 constant with high accuracy and enables the gas sensor 100 to accurately measure the NOx concentration.

The auxiliary pump cell 50 is an auxiliary electrochemical pump cell including an auxiliary pump electrode 51 having a ceiling electrode portion 51a disposed over substantially the entire lower surface of the second solid electrolyte layer 6 that faces the second internal cavity 40, the outer pump electrode 23 (or any other suitable electrode on the outer side of the sensor element 101 in place of the outer pump electrode 23), and the second solid electrolyte layer 6.

The auxiliary pump electrode 51 has a tunnel structure similar to that of the inner pump electrode 22 disposed in the first internal cavity 20 described above, and is disposed in the second internal cavity 40. That is, the ceiling electrode portion 51a is formed on the second solid electrolyte layer 6, which forms a ceiling surface of the second internal cavity 40. A bottom electrode portion 51b is formed directly on the upper surface of the first solid electrolyte layer 4, which forms a bottom surface of the second internal cavity 40. Side electrode portions (not illustrated) are formed on both side-wall surfaces of the spacer layer 5, which form sidewalls of the second internal cavity 40, so as to connect the ceiling electrode portion 51a and the bottom electrode portion 51b to each other. Thus, the tunnel structure is provided. Like the inner pump electrode 22, the auxiliary pump electrode 51 is also formed of a material having lowered reduction ability for the NOx component in the measurement-object gas.

In the auxiliary pump cell 50, a desired voltage Vp1 is applied between the auxiliary pump electrode 51 and the outer pump electrode 23. Accordingly, the auxiliary pump cell 50 is capable of pumping out oxygen in the atmosphere in the second internal cavity 40 to the external space or pumping oxygen into the second internal cavity 40 from the external space.

To control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 form an electrochemical sensor cell, that is, an auxiliary-pump-control oxygen-partial-pressure detection sensor cell 81.

The auxiliary pump cell 50 performs pumping at a variable power supply 52 whose voltage is controlled on the basis of an electromotive force V1 detected by the auxiliary-pump-control oxygen-partial-pressure detection sensor cell 81. Accordingly, the oxygen partial pressure in the atmosphere in the second internal cavity 40 is controlled to a low partial pressure that does not substantially affect NOx measurement.

Additionally, a pump current Ip1 is used to control the electromotive force of the main-pump-control oxygen-partial-pressure detection sensor cell 80. Specifically, the pump current Ip1 is input as a control signal to the main-pump-control oxygen-partial-pressure detection sensor cell 80, for which the electromotive force V0 is controlled to perform control so that the gradient of the oxygen partial pressure in the measurement-object gas to be introduced into the second internal cavity 40 from the third diffusion control section 30 remains always constant. When the gas sensor 100 is used as a NOx sensor, the oxygen concentration in the second internal cavity 40 is kept at a constant value of approximately 0.001 ppm by the operation of the main pump cell 21 and the auxiliary pump cell 50.

The fourth diffusion control section 60 is a portion that applies a predetermined diffusion resistance to the measurement-object gas whose oxygen concentration (oxygen partial pressure) is controlled in the second internal cavity 40 by the operation of the auxiliary pump cell 50 to guide the measurement-object gas into the third internal cavity 61. The fourth diffusion control section 60 serves to limit the amount of NOx flowing into the third internal cavity 61.

The third internal cavity 61 is provided as a space for, after the adjustment of the oxygen concentration (oxygen partial pressure) in the second internal cavity 40 in advance, performing a process on the measurement-object gas introduced through the fourth diffusion control section 60 to measure the nitrogen oxide (NOx) concentration in the measurement-object gas. The measurement of the NOx concentration is mainly performed in the third internal cavity 61 by the operation of a measurement pump cell 41.

The measurement pump cell 41 measures the NOx concentration in the measurement-object gas in the third internal cavity 61. The measurement pump cell 41 is an electrochemical pump cell including a measurement electrode 44 disposed directly on the upper surface of the first solid electrolyte layer 4 that faces the third internal cavity 61, the outer pump electrode 23, the second solid electrolyte layer 6, the spacer layer 5, and the first solid electrolyte layer 4. The measurement electrode 44 is a porous cermet electrode (e.g., a cermet electrode of Pt and $ZrO_2$) composed of a material having higher reduction ability for the NOx component in the measurement-object gas than the material of the inner pump electrode 22. The measurement electrode 44 also functions as a NOx reducing catalyst for reducing NOx present in the atmosphere in the third internal cavity 61.

The measurement pump cell 41 is capable of pumping out oxygen, which is produced by decomposition of nitrogen oxides in the atmosphere around the measurement electrode 44, and detecting the amount of the produced oxygen as a pump current Ip2.

Further, to detect the oxygen partial pressure around the measurement electrode 44, the first solid electrolyte layer 4, the third substrate layer 3, the measurement electrode 44, and the reference electrode 42 form an electrochemical sensor cell, that is, a measurement-pump-control oxygen-partial-pressure detection sensor cell 82. A variable power supply 46 is controlled on the basis of an electromotive force (voltage V2) detected by the measurement-pump-control oxygen-partial-pressure detection sensor cell 82.

The measurement-object gas introduced into the second internal cavity 40, whose oxygen partial pressure has been controlled, passes through the fourth diffusion control section 60 and reaches the measurement electrode 44 in the third internal cavity 61. In the measurement-object gas around the measurement electrode 44, nitrogen oxides are reduced to produce oxygen ($2NO \rightarrow N_2+O_2$). The produced oxygen is subjected to pumping by the measurement pump cell 41. In this process, a voltage Vp2 of the variable power supply 46 is controlled so that the voltage V2 detected by the measurement-pump-control oxygen-partial-pressure detection sensor cell 82 becomes constant. Since the amount of oxygen produced around the measurement electrode 44 is proportional to the concentration of nitrogen oxides in the measurement-object gas, the concentration of nitrogen oxides in the measurement-object gas is calculated using the pump current Ip2 of the measurement pump cell 41.

The second solid electrolyte layer 6, the spacer layer 5, the first solid electrolyte layer 4, the third substrate layer 3, the outer pump electrode 23, and the reference electrode 42 form an electrochemical sensor cell 83. The oxygen partial pressure in the measurement-object gas outside the sensor can be detected using an electromotive force (voltage Vref) obtained by the sensor cell 83.

Further, the second solid electrolyte layer 6, the spacer layer 5, the first solid electrolyte layer 4, the third substrate layer 3, the outer pump electrode 23, and the reference electrode 42 form an electrochemical reference-gas regulating pump cell 90. The reference-gas regulating pump cell 90 performs pumping by the flow of a control current Ip3 that is caused by a control voltage Vp3 applied by a power supply circuit 92 connected between the outer pump electrode 23 and the reference electrode 42. Accordingly, the reference-gas regulating pump cell 90 pumps oxygen into the space around the reference electrode 42 (the air introducing layer 48) from the space around the outer pump electrode 23 (the sensor element chamber 133 in FIG. 1).

In the gas sensor 100 having the configuration described above, the main pump cell 21 and the auxiliary pump cell 50 are activated to provide the measurement pump cell 41 with the measurement-object gas whose oxygen partial pressure is kept at a constant low value (value that does not substantially affect NOx measurement). Accordingly, the NOx concentration in the measurement-object gas can be determined on the basis of the pump current Ip2 caused to flow by the measurement pump cell 41 pumping out oxygen produced by reducing NOx approximately in proportion to the concentration of NOx in the measurement-object gas.

The sensor element 101 further includes a heater unit 70 that serves to perform temperature adjustment to heat the sensor element 101 and keep the sensor element 101 warm to enhance the oxygen ion conductivity of the solid electrolyte. The heater unit 70 includes a heater connector electrode 71, a heater 72, a through hole 73, a heater insulating layer 74, a pressure release hole 75, and a lead wire 76.

The heater connector electrode 71 is an electrode formed in contact with a lower surface of the first substrate layer 1. Connecting the heater connector electrode 71 to an external power supply allows external power feeding to the heater unit 70.

The heater 72 is an electric resistor formed to be vertically held between the second substrate layer 2 and the third substrate layer 3. The heater 72 is connected to the heater connector electrode 71 via the lead wire 76 and the through hole 73. The heater 72 generates heat in response to power fed thereto from outside through the heater connector electrode 71 to heat the solid electrolyte included in the sensor element 101 and keep the solid electrolyte warm.

The heater 72 is embedded across an entire area from the first internal cavity 20 to the third internal cavity 61 and is configured to adjust the entire sensor element 101 to a temperature at which solid electrolyte is active.

The heater insulating layer 74 is an insulating layer composed of porous alumina, which is formed of an insulating material such as alumina on upper and lower surfaces of the heater 72. The heater insulating layer 74 is formed to provide electrical insulation between the second substrate layer 2 and the heater 72 and electrical insulation between the third substrate layer 3 and the heater 72.

The pressure release hole 75 is a portion provided so as to extend through the third substrate layer 3 and the air introducing layer 48. The pressure release hole 75 is formed to mitigate an increase in internal pressure that is caused by a temperature rise in the heater insulating layer 74.

The variable power supplies 25, 46, and 52 and the power supply circuit 92 illustrated in FIG. 2 and the like are actually connected to the respective electrodes via lead wires (not illustrated) formed in the sensor element 101 and the connector 150 and the lead wires 155 illustrated in FIG. 1.

The following describes an example method for manufacturing the gas sensor 100. First, six unfired ceramic green sheets are prepared, each containing an oxygen-ion-conductive solid electrolyte such as zirconia as the ceramic component. A plurality of sheet holes used for positioning during printing or stacking, a plurality of required through holes, and the like are formed in the green sheets in advance. A space that forms the measurement-object gas flow section is provided in advance in the green sheet for the spacer layer 5 by punching or the like. Then, the ceramic green sheets are subjected to a pattern printing process and a drying process in accordance with the first substrate layer 1, the second substrate layer 2, the third substrate layer 3, the first solid electrolyte layer 4, the spacer layer 5, and the second solid electrolyte layer 6 to form various patterns on the respective ceramic green sheets. Specifically, the patterns to be formed are patterns for, for example, the respective electrodes described above, lead wires to be connected to the respective electrodes, the air introducing layer 48, and the heater unit 70. The pattern printing process is performed by applying pattern-forming paste, which is prepared according to the properties required for the respective objects to be formed, to the green sheets by using a known screen printing technique. The drying process is also performed using a known drying device. Upon completion of pattern printing and drying, an adhesive paste for stacking and bonding the green sheets corresponding to the respective layers is printed and dried. Then, a pressure bonding process is performed. Specifically, the respective green sheets with the adhesive paste formed thereon are positioned by aligning the sheet holes, stacked in a predetermined order, and then subjected to pressure bonding under predetermined temperature and pressure conditions to form a single layered body. The resulting layered body includes a plurality of sensor elements 101. The layered body is cut into the size of the sensor elements 101. Each of the cut pieces of the layered body is fired at a predetermined firing temperature to produce the sensor element 101.

After the sensor element 101 is obtained in the way described above, the sensor assembly 140 (see FIG. 1) with the sensor element 101 built therein is manufactured, and the components, such as the protective cover 130 and the rubber stopper 157, are mounted in the sensor assembly 140 to produce the gas sensor 100.

The functions of the reference-gas regulating pump cell 90 will now be described in detail. The measurement-object gas is introduced into the measurement-object gas flow section such as the gas inlet 10 in the sensor element 101 from the sensor element chamber 133 illustrated in FIG. 1. On the other hand, the reference gas (air) in the space 149 illustrated in FIG. 1 is introduced into the air introducing layer 48 of the sensor element 101. The sensor element chamber 133 and the space 149 are separated from each other by the sensor assembly 140 (the green compacts 145a and 145b, in particular) and are sealed to prevent gas from flowing therebetween. However, if the pressure of the measurement-object gas is large, the measurement-object gas may slightly enter the space 149. As a result, if the oxygen concentration around the reference electrode 42 is reduced, the reference potential, which is the potential of the reference electrode 42, may change. This may change a voltage based on the reference electrode 42, for example, the voltage V2 of the measurement-pump-control oxygen-partial-pressure detection sensor cell 82, and leads to a reduction in the detection accuracy of the NOx concentration in the measurement-object gas. The reference-gas regulating pump cell 90 serves to suppress such a reduction in detection accuracy. The reference-gas regulating pump cell 90 applies the control voltage Vp3 between the reference electrode 42 and the outer pump electrode 23 to cause the control current Ip3 to flow therebetween, thereby performing pumping-in of oxygen from around the outer pump electrode 23 to around the reference electrode 42. Accordingly, as described above, when the measurement-object gas decreases the oxygen concentration around the reference electrode 42, the reduced amount of oxygen can be compensated for, and a reduction in the detection accuracy of the NOx concentration can be suppressed.

Figure 3:
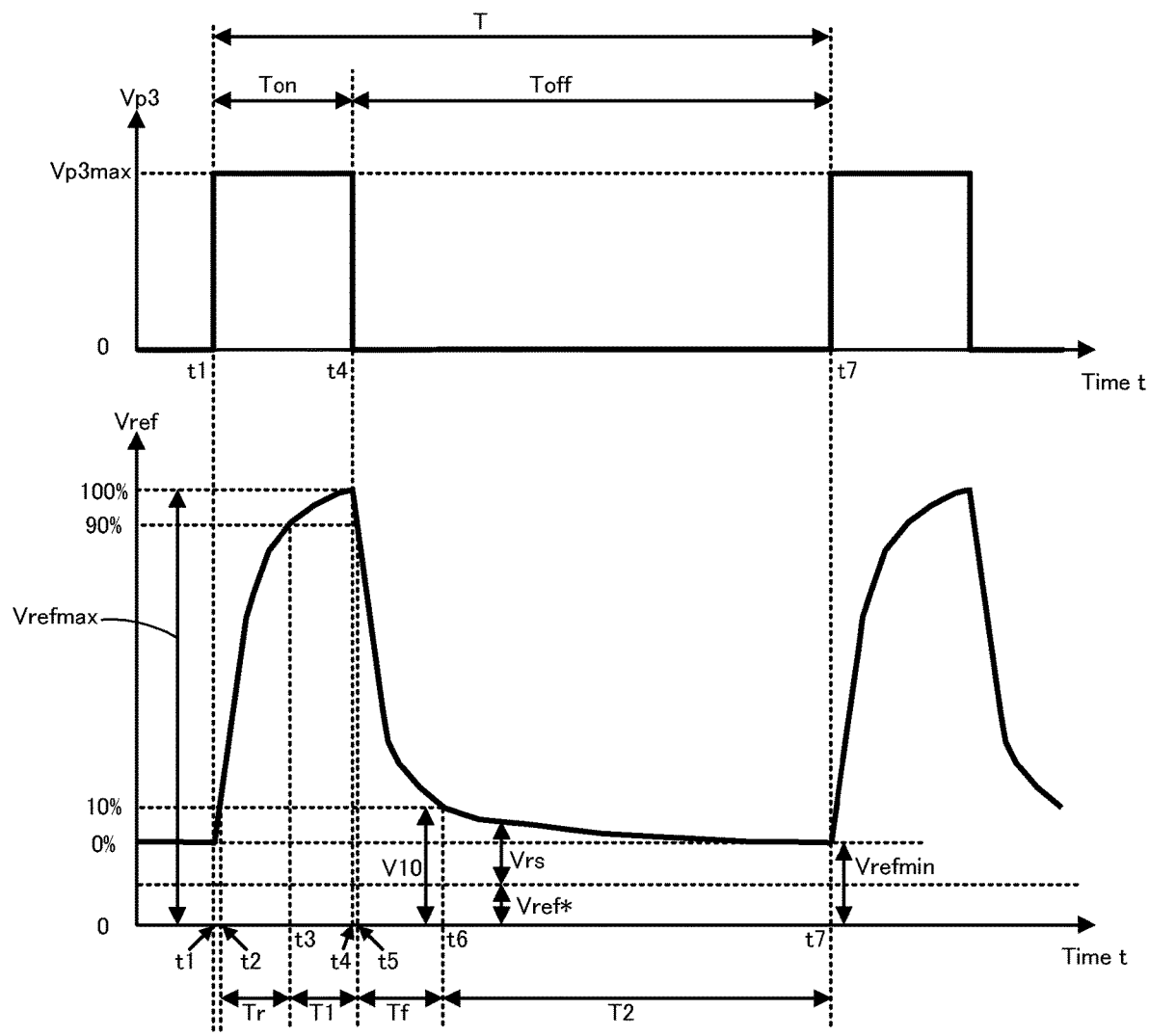
FIG. 3 is an explanatory diagram illustrating time changes of a control voltage Vp3 and a voltage Vref.

The power supply circuit 92 of the reference-gas regulating pump cell 90 applies, as the control voltage Vp3, a voltage that is repeatedly turned on and off. Accordingly, there are a first period and a second period. During the first period, the voltage Vref between the reference electrode 42 and the outer pump electrode 23 has a large value (=potential difference between the reference electrode 42 and the outer pump electrode 23). During the second period, the voltage Vref has a small value. FIG. 3 is an explanatory diagram illustrating time changes of the control voltage Vp3 and the voltage Vref. The upper part of FIG. 3 illustrates the time change of the control voltage Vp3, and the lower part of FIG. 3 illustrates the time change of the voltage Vref. The control voltage Vp3 and the voltage Vref are positive when the potential of the reference electrode 42 is higher than that of the outer pump electrode 23. In FIG. 3, the upward direction on the vertical axis represents the positive direction. As illustrated in FIG. 3, the control voltage Vp3 is a voltage having a pulse waveform that is repeatedly turned on and off in a cycle T. For example, when the control voltage Vp3 is turned on at time t1, the control voltage Vp3 rises from 0 V to a maximum voltage Vp3max and remains in the same state until time t4 at which an on time Ton elapses. When the control voltage Vp3 is turned off at time t4, the control voltage Vp3 remains at 0 V until time t7 at which an off time Toff elapses. In response to the control voltage Vp3, the voltage Vref starts to rise at time t1, reaching a maximum voltage Vrefmax at time t4, and starts to fall at time t4, reaching a minimum voltage Vrefmin at time t7. At this time, a difference between the maximum voltage Vrefmax and the minimum voltage Vrefmin of the voltage Vref, which is generated by turning the control voltage Vp3 on and off, is represented as 100%, which is used as a reference to determine a rise period, the first period, a fall period, and the second period of the voltage Vref. Specifically, a period during which the voltage Vref rises from 10% to 90% (time t2 to time t3) is represented as the rise period, and the length thereof is represented as a rise time Tr. A period during which the voltage Vref is greater than or equal to 90% (time t3 to time t5) is represented as the first period, and the length thereof is represented as a first time T1. A period during which the voltage Vref falls from 90% to 10% (time t5 to time t6) is represented as the fall period, and the length thereof is represented as a fall time Tf. A period from when the voltage Vref falls to 10% to when the voltage Vref starts to rise in response to the control voltage Vp3 being turned on in the next cycle (time t6 to time t7) is represented as the second period, and the length thereof is represented as a second time T2. The voltage Vref at the beginning of the second period, that is, the voltage obtained when the voltage Vref falls to 10%, is represented as a fall voltage V10. In FIG. 3, the voltage Vref becomes the maximum voltage Vrefmax for the first time at time t4 at which the control voltage Vp3 falls. However, if the on time Ton is long, the voltage Vref may reach the maximum voltage Vrefmax before time t4.

During the second period, the measurement pump cell 41 detects the NOx concentration in the measurement-object gas on the basis of the voltage V2. More specifically, during the second period, the measurement pump cell 41 obtains the value of the voltage V2 and performs feedback control of the voltage Vp2 of the variable power supply 46 so that the voltage V2 becomes a predetermined constant value (referred to as target value V2*) (i.e., so that the oxygen concentration in the third internal cavity 61 becomes a predetermined low concentration). Accordingly, oxygen is pumped out of the third internal cavity 61 such that oxygen produced by reducing NOx in the measurement-object gas in the third internal cavity 61 becomes substantially zero. Then, the measurement pump cell 41 detects the value of the pump current Ip2 caused to flow by the voltage Vp2. As described above, the measurement pump cell 41 detects the NOx concentration (here, the pump current Ip2) during the second period, thereby making it possible to suppress the reduction in the detection accuracy of the NOx concentration caused by the control voltage Vp3 for pumping-in of oxygen to the measurement electrode 44. For example, consideration is given to a case where the measurement pump cell 41 measures the NOx concentration during the first period. In this case, unlike the second period, the control voltage Vp3 is in on state during the first period, and thus the voltage Vref is changed to a value higher than the voltage Vref*, which is the value obtained otherwise (voltage based on an oxygen concentration difference between an area around the reference electrode 42 and an area around the outer pump electrode 23). Accordingly, the potential of the reference electrode 42 changes, and the voltage V2 also changes. Thus, if the measurement pump cell 41 causes the pump current Ip2 to flow on the basis of the voltage V2 during the first period, the pump current Ip2 is likely to deviate from the correct value representing the NOx concentration, and a reduction in the detection accuracy of the NOx concentration is likely to occur. During the second period, in contrast, the control voltage Vp3 less affects the potential of the reference electrode 42 than during the first period. Specifically, the voltage Vref during the second period after the voltage Vref falls is a value closer to the voltage Vref* than the voltage Vref during the first period. Thus, the measurement pump cell 41 measures the NOx concentration during the second period, thereby suppressing a reduction in the detection accuracy of the NOx concentration.

As seen from FIG. 3, the voltage Vref decreases for a certain amount of time from the timing at which the control voltage Vp3 is turned off. Such a decrease in the voltage Vref is considered to be affected by, for example, a capacitance component such as the reference electrode 42. Thus, even during the second period, a residual voltage Vrs resulting from the control voltage Vp3 may be present between the reference electrode 42 and the outer pump electrode 23. In this case, for example, the voltage Vref during the second period is the sum of the voltage Vref* and the residual voltage Vrs. Since the residual voltage Vrs affects the potential of the reference electrode 42, the detection accuracy of the NOx concentration tends to improve as the residual voltage Vrs decreases. Thus, the lower the residual voltage Vrs, the more preferable it is. For example, the lower the fall voltage V10, the more preferable it is. The lower the minimum voltage Vrefmin, the more preferable it is. In addition, since the residual voltage Vrs decreases with time during the second period, a reduction in the detection accuracy of the NOx concentration tends to be suppressed more completely at a time closer to the end of the second period (in FIG. 3, time t7). Accordingly, the measurement pump cell 41 preferably detects the NOx concentration at a timing as later as possible during the second period. It is also preferable that a period required for the measurement pump cell 41 to detect the NOx concentration (e.g., the period from the detection of the voltage V2 to the detection of the value of the pump current Ip2, described above) be included in the second period. The measurement pump cell 41 preferably detects the NOx concentration in the same cycle T as that in which the control voltage Vp3 is turned on and off. This can repeatedly detect the NOx concentration at the same timing during the second period in each cycle T.

Like the measurement pump cell 41, preferably, the main pump cell 21 and the auxiliary pump cell 50 also perform the respective operations during the second period in each cycle T. For example, the main pump cell 21 preferably obtains the electromotive force V0 and performs feedback control of the pump voltage Vp0 on the basis of the obtained electromotive force V0 during the second period in each cycle T. The auxiliary pump cell 50 preferably obtains the electromotive force V1 and performs feedback control of the voltage Vp1 on the basis of the obtained electromotive force V1 during the second period in each cycle T. Accordingly, the operations of the cells 21 and 50 are also less affected by a change in the potential of the reference electrode 42 resulting from the control voltage Vp3.

An average value Ip3ave of the control current (oxygen pump-in current) Ip3 caused to flow by the reference-gas regulating pump cell 90 is preferably 1 to 30 μA. The average value Ip3ave has a correlation with the amount of oxygen to be pumped into around the reference electrode 42 from around the outer pump electrode 23. Setting the average value Ip3ave to 1 to 30 μA makes it likely that the amount of oxygen to be pumped into around the reference electrode 42 becomes appropriate. The average value Ip3ave is more preferably 10 to 25 μA.

In this embodiment, the ratio R1/R2 of a reaction resistance R1 of the reference electrode 42 to a diffusion resistance R2 of a reference gas introducing section (here, the air introducing layer 48) that allows a reference gas to be introduced thereinto and to flow therethrough to the reference electrode 42 is greater than or equal to 0.1 and less than or equal to 2.0. Setting the ratio R1/R2 to be greater than or equal to 0.1 and less than or equal to 2.0 allows the oxygen concentration around the reference electrode 42 to be maintained at an appropriate value. It is therefore possible to suppress a reduction in the detection accuracy of the NOx concentration.

The reaction resistance R1 and the diffusion resistance R2 are values measured by means of AC impedance measurement in the following manner. Specifically, first, the heater 72 heats the sensor element 101 to a use temperature, that is, a temperature at which solid electrolyte is active (here, 850° C.). In this state, an AC voltage is applied between the outer pump electrode 23 and the reference electrode 42 in the air atmosphere, with the frequency being changed, to obtain a Cole-Cole plot (also referred to as Nyquist diagram).

Figure 4:
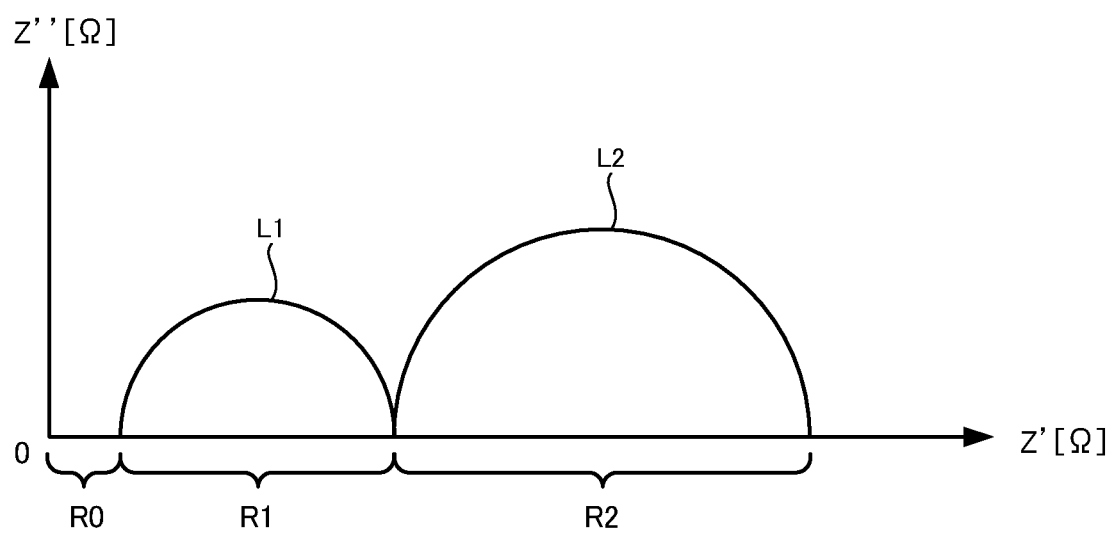
FIG. 4 is an explanatory diagram schematically illustrating a Cole-Cole plot.
Figure 5:
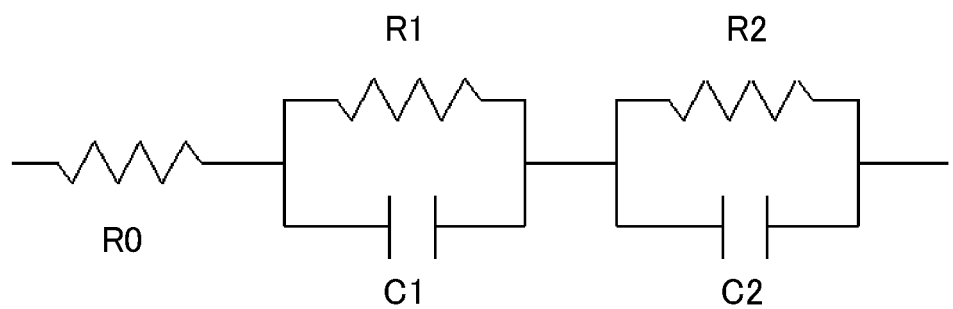
FIG. 5 is an explanatory diagram illustrating an equivalent circuit of solid electrolyte layers, a reference electrode 42, and a reference gas introducing section.

FIG. 4 is an explanatory diagram schematically illustrating the Cole-Cole plot obtained by means of the AC impedance measurement described above. FIG. 5 is an explanatory diagram illustrating an equivalent circuit of solid electrolyte layers, the reference electrode 42, and the reference gas introducing section. In FIG. 4, the horizontal axis is the real axis (Z' axis, with the unit being Ω), and the vertical axis is the imaginary axis (Z'' axis, with the unit being Ω). The relationship among a resistance R0 of solid electrolyte layers (here, the layers 3 to 6, which serve as the path of current between the outer pump electrode 23 and the reference electrode 42 between which a voltage is applied), the reaction resistance R1 of the reference electrode 42, a capacitance C1 of the reference electrode 42, the diffusion resistance R2 of the air introducing layer 48, and a capacitance C2 of the air introducing layer 48 is represented by an equivalent circuit in FIG. 5. In FIG. 5, the resistance R0, a parallel connection of the reaction resistance R1 and the capacitance C1, and a parallel connection of the diffusion resistance R2 and the capacitance C2 are connected in series with each other. As a result of the AC impedance measurement described above, as illustrated in FIG. 4, a waveform including two semicircular curved lines L1 and L2 is obtained. The waveform illustrated in FIG. 4 is produced by plotting data obtained when the frequency of the applied AC voltage decreases toward the right side and plotting data obtained when the frequency of the applied AC voltage increases toward the left side. As illustrated in FIG. 4, in the Cole-Cole plot, the reaction resistance R1 in the equivalent circuit illustrated in FIG. 5 is given by the distance between the two endpoints of the curved line L1 on the real axis. The diffusion resistance R2 in the equivalent circuit is given by the distance between the two endpoints of the curved line L2 on the real axis. Accordingly, the reaction resistance R1 and the diffusion resistance R2 are measured from the Cole-Cole plot obtained by AC impedance measurement. In some cases, the curved line L2 may stop midway such that its endpoint does not reach the real axis. In other cases, the curved line L2 may be arc-shaped, rather than semicircular, and may stop midway such that its endpoint does not reach the real axis. In these cases, the curved line L2 is virtually extended by extrapolation to determine the endpoints on the real axis, and the diffusion resistance R2 is derived. This process is referred to as fitting. Also for the curved line L1, data on the real axis may not be obtained. In this case, fitting is also performed to derive the reaction resistance R1.

In the AC impedance measurement, as described above, an AC voltage is applied between the outer pump electrode 23 and the reference electrode 42. In general, the outer pump electrode 23 is much larger than the reference electrode 42 and has lower reaction resistance. Thus, the resistance component of the outer pump electrode 23 is negligible. For example, the area of the outer pump electrode 23 may be 3.5 times or more an area S1 of the reference electrode 42. Setting the area of the outer pump electrode 23 to be 3.5 times or more the area S1 makes the resistance component of the outer pump electrode 23 negligible. The area of the outer pump electrode 23 may be 12 times or less the area S1. Note that the volume of the outer pump electrode 23 may be 3.5 times or more the volume of the reference electrode 42, or may be 12 times or less the volume of the reference electrode 42.

Since the values of the reaction resistance R1 and the diffusion resistance R2 change also depending on the temperature of the sensor element 101 during measurement, as described above, AC impedance measurement is performed under the condition in which the sensor element 101 is heated to a use temperature. If the use temperature is not clarified, the ratio R1/R2 may be greater than or equal to 0.1 and less than or equal to 2.0 at least at a temperature in the range of 700° C. to 900° C. It is preferable that the ratio R1/R2 be greater than or equal to 0.1 and less than or equal to 2.0 at any temperature in the range of 700° C. to 900° C.

The reaction resistance R1 of the reference electrode 42 has a correlation with the amount of oxygen to be pumped into around the reference electrode 42 from around the outer pump electrode 23. More specifically, if the reaction resistance R1 is excessively small, the amount of pumping-in of oxygen may be excessive. If the reaction resistance R1 is excessively large, the amount of pumping-in of oxygen may be insufficient. The diffusion resistance R2 of the air introducing layer 48 has a correlation with the likelihood of oxygen around the reference electrode 42 being released to the outside (here, the space 149). More specifically, if the diffusion resistance R2 is excessively small, the oxygen pumped into around the reference electrode 42 may flow to the outside without being sufficiently accumulated. If the diffusion resistance R2 is excessively large, the oxygen pumped into around the reference electrode 42 may be excessively accumulated. Setting the ratio R1/R2 to be greater than or equal to 0.1 and less than or equal to 2.0 can maintain a good balance between the amount of oxygen to be pumped into around the reference electrode 42 and the likelihood of oxygen around the reference electrode 42 being released to the outside, and can maintain the oxygen concentration around the reference electrode 42 at an appropriate value. The ratio R1/R2 is preferably greater than or equal to 0.3, and may be greater than or equal to 0.4. The ratio R1/R2 is preferably less than or equal to 1.0.

The reaction resistance R1 of the reference electrode 42 can be adjusted by, for example, changing at least one of the area S1 of the reference electrode 42, a porosity P1 of the reference electrode 42, a thickness H1 of the reference electrode 42, a width W1 of the reference electrode 42, and the length of the reference electrode 42 in the front-rear direction. The diffusion resistance R2 of the air introducing layer 48 can be adjusted by, for example, changing at least one of a porosity P2 of the air introducing layer 48, a thickness H2 of the air introducing layer 48, a width W2 of the air introducing layer 48, and the length of the air introducing layer 48 in the front-rear direction.

The reaction resistance R1 is preferably greater than or equal to 100Ω. When the reaction resistance R1 is greater than or equal to 100Ω, the amount of oxygen to be pumped into around the reference electrode 42 is less likely to be excessive. The reaction resistance R1 is preferably less than or equal to 1000Ω. When the reaction resistance R1 is less than or equal to 1000Ω, the amount of oxygen to be pumped into around the reference electrode 42 is less likely to be insufficient. Setting the reaction resistance R1 to be greater than or equal to 100Ω and less than or equal to 1000Ω makes it likely that the ratio R1/R2 is greater than or equal to 0.1 and less than or equal to 2.0.

The diffusion resistance R2 is preferably greater than or equal to 300Ω. When the diffusion resistance R2 is greater than or equal to 300Ω, the oxygen pumped into around the reference electrode 42 can be prevented from being excessively released to the outside. The diffusion resistance R2 is preferably less than or equal to 1000Ω. When the diffusion resistance R2 is less than or equal to 1000Ω, the oxygen pumped into around the reference electrode 42 can be prevented from being excessively accumulated. Setting the diffusion resistance R2 to be greater than or equal to 300Ω and less than or equal to 1000Ω makes it likely that the ratio R1/R2 is greater than or equal to 0.1 and less than or equal to 2.0.

The area S1 of the reference electrode 42 may be greater than or equal to 1.0 mm$^2$. When the area S1 is greater than or equal to 1.0 mm$^2$, the reaction resistance R1 can be prevented from being excessively small, and the ratio R1/R2 is likely to be greater than or equal to 0.1. The area S1 may be less than or equal to 4.0 mm$^2$. The area S1 is identified as the area of the reference electrode 42 as viewed in a direction perpendicular to the surface (here, the upper surface of the third substrate layer 3) on which the reference electrode 42 is disposed (here, the area of the reference electrode 42 in top view). The same applies to the area of the outer pump electrode 23 described above.

As described above, the reference electrode 42 is porous, and the porosity P1 of the reference electrode 42 may be greater than or equal to 10% and less than or equal to 25%. The porosity P2 of the air introducing layer 48 may be greater than or equal to 20% and less than or equal to 50%. The reference electrode 42 and the air introducing layer 48 may satisfy P1<P2. As the porosity P1 increases, the reaction resistance R1 tends to decrease. As the porosity P1 decreases, the reaction resistance R1 tends to increase. As the porosity P2 increases, the diffusion resistance R2 tends to decrease. As the porosity P2 decreases, the diffusion resistance R2 tends to increase. Setting the porosities P1 and P2 to satisfy at least one of the ranges described above makes it likely that the ratio R1/R2 is adjusted to be greater than or equal to 0.1 and less than or equal to 2.0. The porosities P1 and P2 may satisfy each of the ranges described above. If the porosity P1 is larger than 25%, the reference electrode 42 may not fully adhere to the solid electrolyte layer (here, the third substrate layer 3) and may be peeled off. Setting the porosity P1 to be less than or equal to 25% can prevent the reference electrode 42 from being peeled off.

The thickness H1 of the reference electrode 42 may be greater than or equal to 10 μm and less than or equal to 20 μm. The thickness H2 of the air introducing layer 48 may be greater than or equal to 15 μm and less than or equal to 40 μm. As the thickness H1 increases, the reaction resistance R1 tends to decrease. As the thickness H1 decreases, the reaction resistance R1 tends to increase. As the thickness H2 increases, the diffusion resistance R2 tends to decrease. As the thickness H2 decreases, the diffusion resistance R2 tends to increase. Setting each of the thicknesses H1 and H2 to be a value within the corresponding range makes it likely that the ratio R1/R2 is adjusted to be greater than or equal to 0.1 and less than or equal to 2.0. If the thickness H1 is less than 10 μm, for example, when the reference electrode 42 is formed by using screen printing, the reference electrode 42 is excessively thin, so that it is difficult to form the reference electrode 42 with a uniform thickness. Consequently, variations in the thickness H1 are likely to occur, and the variation of the reaction resistance R1 is likely to be large in the mass production of the sensor element 101. Setting the thickness H1 to be greater than or equal to 10 μm can address such a defect. If the thickness H2 is greater than 40 μm, for example, when the air introducing layer 48 is formed by using screen printing, printing is required to be performed a plurality of times. Consequently, variations in the thickness H2 are likely to occur, and the variation of the diffusion resistance R2 is likely to be large in the mass production of the sensor element 101. Setting the thickness H2 to be less than or equal to 40 μm can address such a defect.

The thickness H1 is the dimension in a direction perpendicular to the surface on which the reference electrode 42 is disposed, and the thickness H2 is the dimension in a direction perpendicular to the surface on which the air introducing layer 48 is disposed. That is, in this embodiment, the up-down height of the reference electrode 42 is the thickness H1, and the up-down height of the air introducing layer 48 is the thickness H2. When the air introducing layer 48 does not have a uniform thickness, an average value of the thickness is set as the thickness H2. The same applies to the thickness H1 of the reference electrode 42.

The width W1 of the reference electrode 42 may be greater than or equal to 0.6 mm and less than or equal to 2.5 mm. The width W2 of the air introducing layer 48 may be greater than or equal to 1.5 mm and less than or equal to 3.0 mm. As the width W1 increases, the reaction resistance R1 tends to decrease. As the width W1 decreases, the reaction resistance R1 tends to increase. As the width W2 increases, the diffusion resistance R2 tends to decrease. As the width W2 decreases, the diffusion resistance R2 tends to increase. Setting each of the widths W1 and W2 to be a value within the corresponding range makes it likely that the ratio R1/R2 is adjusted to be greater than or equal to 0.1 and less than or equal to 2.0. The width W1 is the dimension in a direction perpendicular to the thickness direction of the reference electrode 42 (here, the up-down direction) and the longitudinal direction of the sensor element 101 (here, the front-rear direction), and the width W2 is the dimension in a direction perpendicular to the thickness direction of the air introducing layer 48 (here, the up-down direction) and the longitudinal direction of the sensor element 101 (here, the front-rear direction). That is, in this embodiment, the left-right dimension of the reference electrode 42 is the width W1, and the left-right dimension of the air introducing layer 48 is the width W2. When the air introducing layer 48 does not have a uniform width, an average value of the width is set as the width W2. The same applies to the width W1 of the reference electrode 42.

The thickness H2 of the air introducing layer 48 may be larger than the thickness H1 of the reference electrode 42, and the width W2 of the air introducing layer 48 may be larger than the width W1 of the reference electrode 42. Accordingly, the diffusion resistance R2 is likely to have a larger value than the reaction resistance R1, thus making it likely that the ratio R1/R2 is adjusted to be greater than or equal to 0.1 and less than or equal to 2.0.

The correspondence between the constituent elements of this embodiment and the constituent elements of the present invention will now be clarified. The first substrate layer 1, the second substrate layer 2, the third substrate layer 3, the first solid electrolyte layer 4, the spacer layer 5, and the second solid electrolyte layer 6 of this embodiment correspond to an element body of the present invention, the measurement electrode 44 corresponds to a measurement electrode, the outer pump electrode 23 corresponds to a measurement-object-gas-side electrode, the reference electrode 42 corresponds to a reference electrode, the air introducing layer 48 corresponds to a reference gas introducing section, the sensor element 101 corresponds to a sensor element, the measurement pump cell 41 corresponds to a detection device, and the reference-gas regulating pump cell 90 corresponds to a reference gas regulating device. The air introducing layer 48 corresponds to a reference gas introducing layer.

In the gas sensor 100 according to this embodiment described above in detail, the reference-gas regulating pump cell 90 causes the control current Ip3 to flow between the reference electrode 42 and the outer pump electrode 23 to pump oxygen into around the reference electrode 42. This can compensate for a decrease in oxygen concentration around the reference electrode 42. In addition, setting the ratio R1/R2 of the reaction resistance R1 of the reference electrode 42 to the diffusion resistance R2 of the reference gas introducing section (here, the air introducing layer 48) to be greater than or equal to 0.1 and less than or equal to 2.0 allows the oxygen concentration around the reference electrode 42 to be maintained at an appropriate value. In the gas sensor 100, therefore, a reduction in the detection accuracy of the specific gas concentration is suppressed.

In addition, setting the ratio R1/R2 to be greater than or equal to 0.3 and less than or equal to 1.0 enhances the effect of maintaining the oxygen concentration around the reference electrode 42 at an appropriate value. Setting the reaction resistance R1 to be greater than or equal to 100Ω and less than or equal to 1000Ω makes it likely that the ratio R1/R2 is greater than or equal to 0.1 and less than or equal to 2.0. Setting the diffusion resistance R2 to be greater than or equal to 300Ω and less than or equal to 1000Ω makes it likely that the ratio R1/R2 is greater than or equal to 0.1 and less than or equal to 2.0. Setting the area S1 to be greater than or equal to 1.0 mm² makes it likely that the ratio R1/R2 is greater than or equal to 0.1.

In addition, the porosity P1 is greater than or equal to 10% and less than or equal to 25%, the porosity P2 is greater than or equal to 20% and less than or equal to 50%, and the porosity P1 and the porosity P2 satisfy P1<P2. This makes it likely that the ratio R1/R2 is greater than or equal to 0.1 and less than or equal to 2.0. Setting the thickness H1 and the thickness H2 to satisfy H2>H1 and the width W1 and the width W2 to satisfy W2>W1 makes it likely that the ratio R1/R2 is greater than or equal to 0.1 and less than or equal to 2.0. Setting the thickness H1 to be greater than or equal to 10 μm and less than or equal to 20 μm, and the thickness H2 to be greater than or equal to 15 μm and less than or equal to 40 μm makes it likely that the ratio R1/R2 is greater than or equal to 0.1 and less than or equal to 2.0. Setting the width W1 to be greater than or equal to 0.6 mm and less than or equal to 2.5 mm and the width W2 to be greater than or equal to 1.5 mm and less than or equal to 3.0 mm makes it likely that the ratio R1/R2 is greater than or equal to 0.1 and less than or equal to 2.0.

It goes without saying that the present invention is not limited to the embodiment described above and may be implemented in various forms without departing from the technical scope of the present invention.

Figure 6:
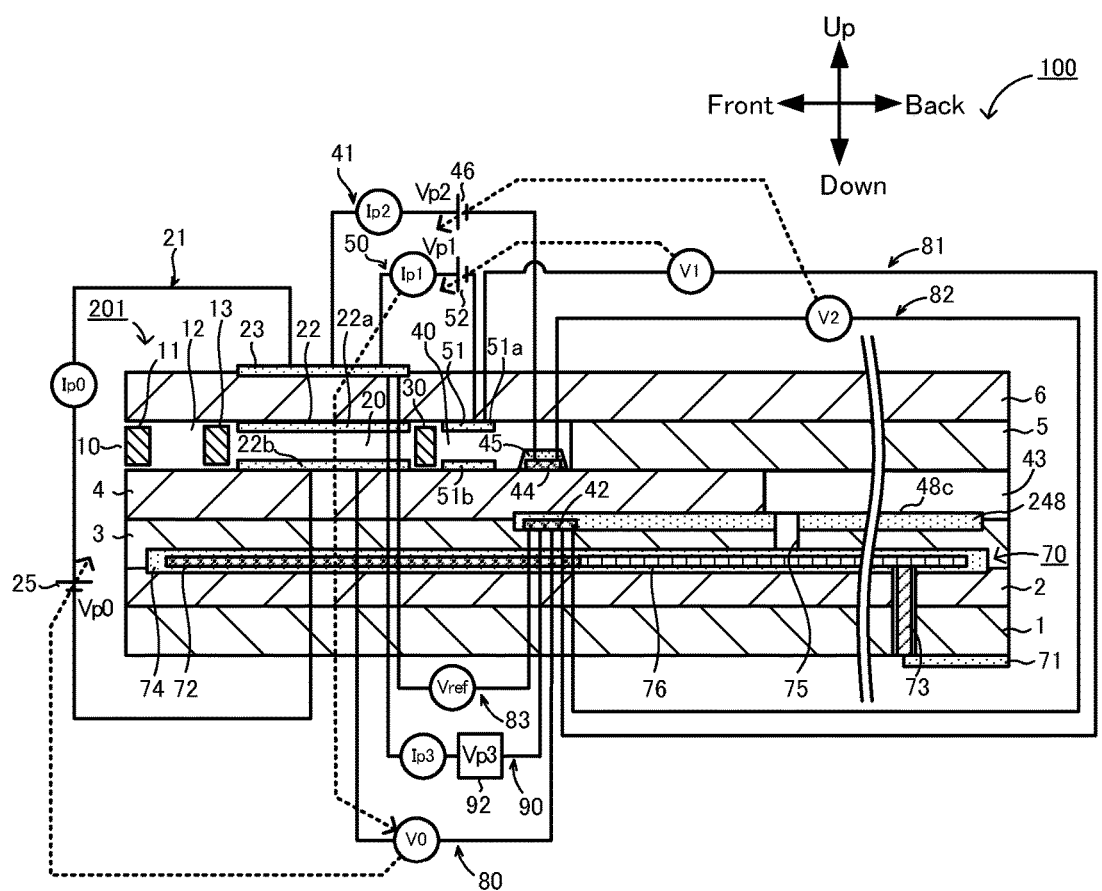
FIG. 6 is a schematic sectional view of a sensor element 201 according to a modification.

In the embodiment described above, the air introducing layer 48 is disposed across an area from the reference electrode 42 up to the rear end surface of the sensor element 101 in the longitudinal direction, although this is not intended to be limiting. FIG. 6 is a schematic sectional view of a sensor element 201 according to a modification. As illustrated in FIG. 6, the sensor element 201 includes a reference gas introducing space 43 above an air introducing layer 248. The reference gas introducing space 43 is a space disposed between the upper surface of the third substrate layer 3 and a lower surface of the spacer layer 5 at a position at which the sides of the space are defined by side surfaces of the first solid electrolyte layer 4. The reference gas introducing space 43 has a rear end that is open to a rear end surface of the sensor element 201. The reference gas introducing space 43 is disposed to the front of the pressure release hole 75 in the front-rear direction, and the pressure release hole 75 is open to the reference gas introducing space 43. Unlike the air introducing layer 48, the air introducing layer 248 is not disposed up to a rear end of the sensor element 201. Thus, the air introducing layer 248 is not exposed to the rear end surface of the sensor element 201. Instead of this, a portion of an upper surface of the air introducing layer 248 is exposed to the reference gas introducing space 43. The exposed portion serves as the inlet 48c in the air introducing layer 248. A reference gas is introduced into the air introducing layer 248 through the inlet 48c from the reference gas introducing space 43. In the sensor element 201, the air introducing layer 248 may be disposed up to the rear end of the sensor element 201 such that a rear end of the air introducing layer 248 matches the rear end of the sensor element 201. In the configuration in FIG. 6, the air introducing layer 248 and the reference gas introducing space 43 correspond to a reference gas introducing section. In the configuration in FIG. 6, the diffusion resistance R2 measured using the method described above has a value that reflects the diffusion resistance of the air introducing layer 248 and the diffusion resistance of the reference gas introducing space 43.

In the embodiment described above, the sensor element 101 of the gas sensor 100 includes the first internal cavity 20, the second internal cavity 40, and the third internal cavity 61, although this is not intended to be limiting. For example, as in the sensor element 201 illustrated in FIG. 6 described above, the third internal cavity 61 may not be included. In the sensor element 201 according to the modification illustrated in FIG. 6, the gas inlet 10, the first diffusion control section 11, the buffer space 12, the second diffusion control section 13, the first internal cavity 20, the third diffusion control section 30, and the second internal cavity 40 are formed adjacent and communicate in the stated order between the lower surface of the second solid electrolyte layer 6 and the upper surface of the first solid electrolyte layer 4. The measurement electrode 44 is disposed on the upper surface of the first solid electrolyte layer 4 within the second internal cavity 40. The measurement electrode 44 is covered with a fourth diffusion control section 45. The fourth diffusion control section 45 is a film made of a porous ceramic material such as alumina ($Al_2O_3$). Like the fourth diffusion control section 60 according to the embodiment described above, the fourth diffusion control section 45 serves to limit the amount of NOx flowing into the measurement electrode 44. The fourth diffusion control section 45 also serves as a protective film of the measurement electrode 44. The ceiling electrode portion 51a of the auxiliary pump electrode 51 is formed up to a position immediately above the measurement electrode 44. In the sensor element 201 having the configuration described above, the measurement pump cell 41 is capable of detecting the NOx concentration in a way similar to that in the embodiment described above. In the sensor element 201 illustrated in FIG. 6, a portion around the measurement electrode 44 serves as a measurement chamber. That is, an area around the measurement electrode 44 has a function similar to that of the third internal cavity 61.

In the embodiment described above, the outer pump electrode 23 serves as an electrode (also referred to as outer measurement electrode) paired with the measurement electrode 44 of the measurement pump cell 41 and also serves as a measurement-object-gas-side electrode paired with the reference electrode 42 of the reference-gas regulating pump cell 90, although this is not intended to be limiting. At least one of the outer measurement electrode and the measurement-object-gas-side electrode may be disposed on the outer side of the element body, separately from the outer pump electrode 23, so as to come into contact with the measurement-object gas. In addition, the measurement-object-gas-side electrode of the reference-gas regulating pump cell 90 may be disposed in a portion of the sensor element 101 that comes into contact with the measurement-object gas, and the measurement-object-gas-side electrode may not be located on the outer side of the element body. For example, the inner pump electrode 22 may also serve as the measurement-object-gas-side electrode of the reference-gas regulating pump cell 90. Also in this case, in the measurement of the reaction resistance R1 and the diffusion resistance R2, as described above, an AC voltage is applied between the outer pump electrode 23 and the reference electrode 42. If an AC voltage is applied between the inner pump electrode 22 and the reference electrode 42 to measure the reaction resistance R1 and the diffusion resistance R2, the measured values are likely to have an error due to the influence of the first diffusion control section 11 and the second diffusion control section 13.

In the embodiment described above, a surface of a front portion of the sensor element 101 including the outer pump electrode 23 (a portion exposed to the sensor element chamber 133) may be covered with a porous protective layer made of ceramics such as alumina. As described above, since the outer pump electrode 23 is much larger than the reference electrode 42, the diffusion resistance of a porous protective layer that covers the outer pump electrode 23 is much smaller than the diffusion resistance R2 of the air introducing layer 48. Thus, the effect of the diffusion resistance of the porous protective layer on the AC impedance measurement is negligible. There is no need to remove the porous protective layer during the AC impedance measurement.

In the embodiment described above, the voltage Vp2 of the variable power supply 46 is controlled so that the voltage V2 detected by the measurement-pump-control oxygen-partial-pressure detection sensor cell 82 becomes constant, and the concentration of nitrogen oxides in the measurement-object gas is calculated using the flow of the pump current Ip2 at this time. Alternatively, any other device configured to detect a specific gas concentration in the measurement-object gas on the basis of a voltage between the reference electrode 42 and the measurement electrode 44 may be used. For example, the measurement electrode 44, the first solid electrolyte layer 4, the third substrate layer 3, and the reference electrode 42 may be used in combination to form an oxygen partial pressure detection device serving as an electrochemical sensor cell. Accordingly, a voltage corresponding to a difference between the amount of oxygen produced by reducing the NOx component in the atmosphere around the measurement electrode 44 and the amount of oxygen around the reference electrode 42 can be detected as the voltage V2, which can be used to determine the concentration of the NOx component in the measurement-object gas. In this case, this electrochemical sensor cell corresponds to a detection device of the present invention. In this manner, when the voltage V2 is detected as the value corresponding to the NOx concentration, it is preferable that the voltage Vp2 of the variable power supply 46 be controlled (e.g., the voltage Vp2 be subjected to feedback control or the voltage Vp2 be subjected to constant control) so that the pump current Ip2 becomes a constant target value Ip2*. The measurement pump cell 41 is controlled so that the pump current Ip2 becomes the target value Ip2*, thereby allowing oxygen to be pumped out of the third internal cavity 61 at a substantially constant flow rate. Thus, the oxygen concentration in the third internal cavity 61 changes in accordance with the amount of oxygen produced by reducing NOx in the measurement-object gas in the third internal cavity 61, and the voltage V2 changes accordingly. The voltage V2 is thus a value corresponding to the NOx concentration in the measurement-object gas. It is therefore possible to calculate the NOx concentration on the basis of the voltage V2.

In the embodiment described above, the reference gas is air. Any other gas may be used as a reference to detect the concentration of a specific gas in the measurement-object gas. For example, the space 149 may be filled with a gas that is adjusted in advance to have a predetermined oxygen concentration (>the oxygen concentration of the measurement-object gas) as a reference gas.

In the embodiment described above, the sensor element 101 is configured to detect the NOx concentration in the measurement-object gas. Alternatively, any other device may be used to detect the concentration of a specific gas in the measurement-object gas. For example, the concentration of oxides other than NOx may be detected as a specific gas concentration. When the specific gas is an oxide, as in the embodiment described above, the specific gas itself is reduced in the third internal cavity 61 to produce oxygen. Thus, the measurement pump cell 41 may obtain a detected value (e.g., the pump current Ip2) corresponding to the oxygen to detect the specific gas concentration.

Alternatively, the specific gas may be a non-oxide such as ammonia. When the specific gas is a non-oxide, the specific gas is converted to oxide (e.g., ammonia is converted to NO) such that the converted gas is reduced in the third internal cavity 61 to produce oxygen. The measurement pump cell 41 obtains a detected value (e.g., the pump current Ip2) corresponding to the oxygen to detect the specific gas concentration. For example, the inner pump electrode 22 of the first internal cavity 20 functions as catalyst to convert ammonia to NO in the first internal cavity 20.

In the embodiment described above, the element body of the sensor element 101 is a layered body having a plurality of solid electrolyte layers (the layers 1 to 6), although this is not intended to be limiting. The element body of the sensor element 101 may include at least one oxygen-ion-conductive solid electrolyte layer. For example, in FIG. 2, the layers 1 to 5, except for the second solid electrolyte layer 6, may be layers other than a solid electrolyte layer (e.g., alumina layers). In this case, the respective electrodes of the sensor element 101 may be disposed on the second solid electrolyte layer 6. For example, the measurement electrode 44 illustrated in FIG. 2 may be disposed on the lower surface of the second solid electrolyte layer 6. The air introducing layer 48 may be disposed between the second solid electrolyte layer 6 and the spacer layer 5, instead of between the first solid electrolyte layer 4 and the third substrate layer 3, and the reference electrode 42 may be disposed to the rear of the third internal cavity 61 on the lower surface of the second solid electrolyte layer 6.

In the embodiment described above, the inner pump electrode 22 is a cermet electrode of Pt and $ZrO_2$ containing 1% Au, although this is not intended to be limiting. The inner pump electrode 22 may contain a catalytically active noble metal (e.g., at least one of Pt, Rh, Ir, Ru, and Pd) and a noble metal (e.g., Au) having the catalytic activity inhibition ability to inhibit the catalytic activity of the catalytically active noble metal for the specific gas. Like the inner pump electrode 22, the auxiliary pump electrode 51 may contain a catalytically active noble metal and a noble metal having the catalytic activity inhibition ability. The outer pump electrode 23, the reference electrode 42, and the measurement electrode 44 may each contain the catalytically active noble metal described above. The electrodes 22, 23, 42, 44, and 51 are each preferably formed of a cermet containing a noble metal and an oxygen-ion-conductive oxide (e.g., $ZrO_2$). However, one or more of these electrodes may not be formed of a cermet. The electrodes 22, 23, 42, 44, and 51 are each preferably a porous body. However, one or more of these electrodes may not be a porous body.

In the embodiment described above, the pump current Ip1 is used to control the electromotive force V0 of the main-pump-control oxygen-partial-pressure detection sensor cell 80, although this is not intended to be limiting. For example, feedback control of the pump voltage Vp0 may be performed on the basis of the pump current Ip1 so that the pump current Ip1 becomes a target value Ip1*. That is, the control of the electromotive force V0 based on the pump current Ip1 may be omitted, and the pump voltage Vp0 may be directly controlled (and therefore the pump current Ip0 may be controlled) on the basis of the pump current Ip1.

In the embodiment described above, the control voltage Vp3 is a voltage that is repeatedly turned on and off, although this is not intended to be limiting. For example, the control voltage Vp3 may be a constant voltage that is not repeatedly turned on and off, such as a DC voltage.

Figure 7:
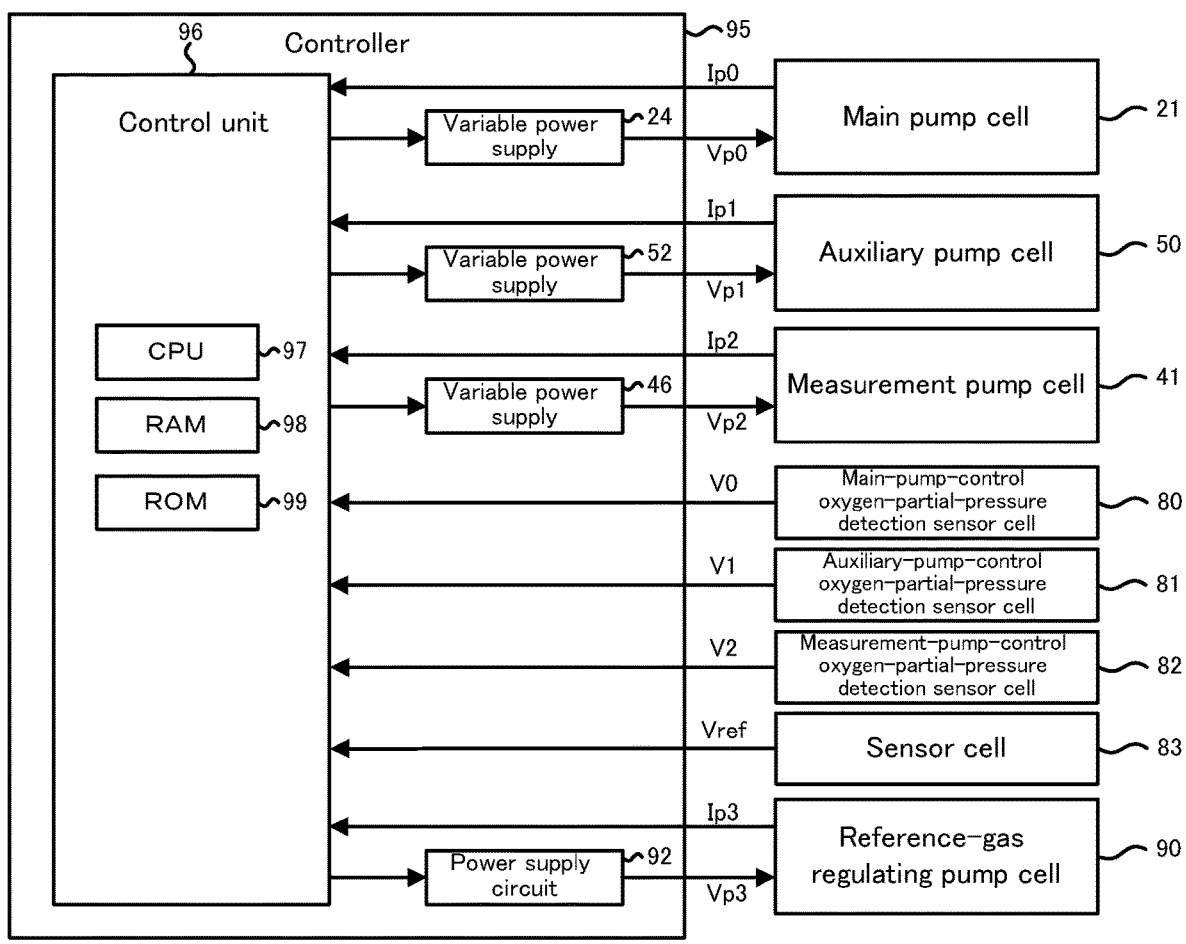
FIG. 7 is a block diagram illustrating an electrical connection relationship between a controller 95 and each cell.

The embodiment described above does not describe a controller for controlling the cells 21, 41, 50, 80 to 83, and 90 described above and so on. The gas sensor 100 may be controlled by this controller. The controller may be identified as part of the gas sensor 100. The following describes an example of the gas sensor 100 that includes the controller. FIG. 7 is a block diagram illustrating an electrical connection relationship between a controller 95 and each cell. The controller 95 includes the variable power supplies 24, 46, and 52 and the power supply circuit 92, which are described above, and a control unit 96. The control unit 96 is configured as a microprocessor such as a CPU 97. The control unit 96 includes the CPU 97, a RAM 98 that temporarily stores data, and a ROM 99 that stores processing programs, various data, and so on. The control unit 96 receives input of the electromotive forces V0 to V2 and the voltage Vref from the sensor cells 80 to 83. The control unit 96 receives input of the pump currents Ip0 to Ip2 and the control current Ip3, which flows through the pump cells 21, 50, 41, and 90. The control unit 96 outputs control signals to the variable power supplies 24, 46, and 52 and the power supply circuit 92 to control the voltages Vp0 to Vp3 to be output from the variable power supplies 24, 46, and 52 and the power supply circuit 92, thereby controlling the pump cells 21, 41, 50, and 90. The ROM 99 stores target values V0* and V1* described below, the target value V2* described above, and so on. The ROM 99 stores information on the control voltage Vp3, which is a voltage that is repeatedly turned on and off, for example, the value of the maximum voltage Vp3max and the values of the on time Ton and the off time Toff (or the value of a duty ratio representing the proportion of the on time Ton in the cycle T). The CPU 97 of the control unit 96 refers to the information stored in the ROM 99 and controls the pump cells 21, 41, 50, and 90. The foregoing has described how the control unit 96 controls the pump cells 21, 41, 50, and 90 (i.e., how the pump cells 21, 41, 50, and 90 are controlled), which is also described hereinbelow. For example, the control unit 96 performs feedback control of the pump voltage Vp0 of the variable power supply 24 so that the electromotive force V0 becomes a target value (referred to as target value V0*) (i.e., the oxygen concentration in the first internal cavity 20 becomes a target concentration). Further, the control unit 96 performs feedback control of the voltage Vp1 of the variable power supply 52 so that the electromotive force V1 becomes a constant value (referred to as target value V1*) (i.e., the oxygen concentration in the second internal cavity 40 becomes a predetermined low oxygen concentration that does not substantially affect NOx measurement). Additionally, the control unit 96 sets (feedback control) the target value V0* of the electromotive force V0 on the basis of the pump current Ip1 so that the pump current Ip1 caused to flow by the voltage Vp1 becomes a constant value (referred to as target value Ip1*). Accordingly, the gradient of the oxygen partial pressure in the measurement-object gas introduced into the second internal cavity 40 from the third diffusion control section 30 remains always constant. In addition, the oxygen partial pressure in the atmosphere in the second internal cavity 40 is controlled to a low partial pressure that does not substantially affect NOx measurement. The target value V0* is set to a value with which the oxygen concentration in the first internal cavity 20 becomes a low oxygen concentration higher than 0%. The control unit 96 further performs feedback control of the voltage Vp2 of the variable power supply 46 on the basis of the voltage V2 (an example of a measurement voltage) so that the voltage V2 becomes the target value V2* described above (an example of a target voltage). The control unit 96 obtains the pump current Ip2 (an example of a measurement pump current) as a detected value for the oxygen produced in the third internal cavity 61 from a specific gas (here, NOx) and calculates the NOx concentration in the measurement-object gas on the basis of the pump current Ip2. The ROM 99 stores the correspondence between the pump current Ip2 and the NOx concentration, namely, a relational expression (e.g., a linear function expression), a map, and so on. The relational expression or the map may be experimentally determined in advance. The control unit 96 detects the NOx concentration in the measurement-object gas on the basis of the obtained pump current Ip2 and the correspondence stored in the ROM 99. As described above, when the control voltage Vp3 is a voltage that is repeatedly turned on and off, the control unit 96 detects the NOx concentration in the measurement-object gas on the basis of the pump current Ip2, which is obtained when the measurement pump cell 41 is controlled so that the voltage V2 obtained during the second period becomes the target value V2*.

When the gas sensor 100 includes the controller 95, the controller 95 corresponds to a measurement pump cell controller and a reference-gas regulating pump cell controller, the measurement pump cell 41 and the controller 95 correspond to a detection device, and the reference-gas regulating pump cell 90 and the controller 95 correspond to a reference gas regulating device. The measurement-pump-control oxygen-partial-pressure detection sensor cell 82 corresponds to a measurement voltage detection unit.

The description of the various modifications of the embodiment described above is applicable to the gas sensor 100 including the controller 95. For example, the control unit 96 may control the measurement pump cell 41 so that the pump current Ip2 becomes the target value Ip2* (an example of a target current), instead of controlling the measurement pump cell 41 so that the voltage V2 becomes the target value V2*, and detects the NOx concentration on the basis of the voltage V2 obtained at this time. In this case, the correspondence between the voltage V2 and the NOx concentration is stored in the ROM 99 in advance, and the control unit 96 detects the NOx concentration on the basis of the correspondence and the obtained voltage V2. In this case, furthermore, when the control voltage Vp3 is a voltage that is repeatedly turned on and off, the control unit 96 controls the measurement pump cell 41 so that the pump current Ip2 becomes the target value Ip2* (an example of a target current), and obtains the voltage V2 during the second period after this control is performed. The control unit 96 detects the NOx concentration in the measurement-object gas on the basis of the obtained voltage V2.

EXAMPLES

The following describes concrete examples of manufacturing a gas sensor as examples. Note that the present invention is not limited to the following examples.

Example 1

In Example 1, the gas sensor 100 illustrated in FIGS. 1 and 2 was produced by using the manufacturing method described above. In the production of the sensor element 101, the ceramic green sheets were formed by tape casting of a mixture of zirconia particles containing 4 mol % yttria as a stabilizer with an organic binder, a dispersing agent, a plasticizer, and an organic solvent. Compacted powders of talc were used as the green compacts 145a and 145b illustrated in FIG. 1. The area S1 of the reference electrode 42 was set to 2.0 mm$^2$, the porosity P1 of the reference electrode 42 was set to 15%, the thickness H1 of the reference electrode 42 was set to 15 μm, and the width W1 of the reference electrode 42 was set to 2.0 mm. The porosity P2 of the air introducing layer 48 was set to 30%, the thickness H2 of the air introducing layer 48 was set to 30 μm, and the width W2 of the air introducing layer 48 was set to 2.5 mm. As a result of measurement of the reaction resistance R1 of the reference electrode 42 and the diffusion resistance R2 of the reference gas introducing section (here, the air introducing layer 48) by means of the AC impedance measurement described above, the reaction resistance R1 was 300Ω and the diffusion resistance R2 was 500Ω. The ratio R1/R2 was 0.60. The AC impedance measurement was performed using Versa STAT4 from Princeton Applied Research. The measurement frequency was set to 0.01 Hz to 1 MHz, and the amplitude of the AC voltage was set to 30 mV. The fitting described above was performed using ZView software from Scribner Associates.

Examples 2 to 8 and Comparative Examples 1 and 2

In Examples 2 to 8 and Comparative Examples 1 and 2, the gas sensors 100 were produced in the same way as those in Example 1, except that the area S1, the porosity P1, the thickness H1, and the width W1 of the reference electrode 42, the porosity P2, the thickness H2, and the width W2 of the air introducing layer 48, and the presence or absence of the reference gas introducing space 43 were changed in various manners as shown in Table 1. The values of the reaction resistance R1, the diffusion resistance R2, and the ratio R1/R2 in Examples 2 to 8 and Comparative Examples 1 and 2 are shown in Table 1. In Table 1, in the "reference gas introducing space" column, "absence" indicates the reference gas introducing section in the configuration illustrated in FIG. 2. This means that the reference gas introducing section includes the air introducing layer 48, but does not include the reference gas introducing space 43 illustrated in FIG. 6. In the "reference gas introducing space" column, "presence" indicates the reference gas introducing section in the configuration illustrated in FIG. 6. This means that the reference gas introducing section includes the air introducing layer 48 and the reference gas introducing space 43.

Evaluation of Detection Accuracy

The gas sensor 100 of Example 1 was attached to a pipe. Then, the heater 72 was energized to set the temperature to 850° C. and heat the sensor element 101. Further, the reference-gas regulating pump cell 90 was activated. The control voltage Vp3 applied by the power supply circuit 92 of the reference-gas regulating pump cell 90 was set as a pulse voltage (a duty ratio of 20%) with the cycle T being 10 msec, the on time Ton being 2.0 msec, and the off time Toff being 8.0 msec. The control voltage Vp3 applied by the power supply circuit 92 was set such that the peak value of the control current Ip3 flowing during voltage-on time became 20 µA. The average value Ip3ave of the control current Ip3 was 10 µA. In this state, a model gas having nitrogen as the base gas, an oxygen concentration of 10%, and a NOx concentration of 500 ppm was prepared and passed through the pipe as a measurement-object gas. This state was maintained for 20 minutes, and the voltage Vref during this time was measured. Measurement was performed in a similar way in Examples 2 to 8 and Comparative Examples 1 and 2.

As the oxygen concentration around the reference electrode 42 becomes higher than the oxygen concentration at the start of measurement (=oxygen concentration in air), the voltage Vref tends to increase with time from the value obtained at the start of measurement. As the voltage Vref increases, the pump current Ip2 tends to decrease from a correct value (value corresponding to a NOx concentration of 500 ppm). In contrast, as the oxygen concentration around the reference electrode 42 becomes lower than the oxygen concentration at the start of measurement, the voltage Vref tends to decrease with time from the value obtained at the start of measurement. As the voltage Vref decreases, the pump current Ip2 tends to become larger than the correct value.

Accordingly, assuming that the value of the voltage Vref at the start of measurement is 100%, when the measured voltage Vref falls within a predetermined range (greater than or equal to 80% and less than or equal to 120%) even after 20 minutes elapses, it is determined that the detection accuracy of the NOx concentration is very high ("A"). When the measured voltage Vref falls within the predetermined range until 15 minutes elapses and exceeds the upper limit of the predetermined range before 20 minutes elapses, it is determined that the amount of oxygen around the reference electrode 42 is slightly large, but the detection accuracy of the NOx concentration is high ("B(+)"). When the measured voltage Vref falls within the predetermined range until 15 minutes elapses and drops below the lower limit of the predetermined range before 20 minutes elapses, it is determined that the amount of oxygen around the reference electrode 42 is slightly small, but the detection accuracy of the NOx concentration is high ("B(-)"). When the measured voltage Vref exceeds the upper limit of the predetermined range before 15 minutes elapses, it is determined that the amount of oxygen around the reference electrode 42 is excessive and the detection accuracy of the NOx concentration is low ("F(+)"). When the measured voltage Vref drops below the lower limit of the predetermined range before 15 minutes elapses, it is determined that the amount of oxygen around the reference electrode 42 is insufficient and the detection accuracy of the NOx concentration is low ("F(-)"). The results of the evaluation test are shown in Table 1.

TABLE 1

| | Reaction resistance R1 of the reference electrode [Ω] | Diffusion resistance R2 of the reference gas introducing section [Ω] | R1/R2 | Evaluation | Area S1 of the reference electrode [mm$^2$] | Reference gas introducing space | Porosity P1 of the reference electrode [%] |
|---|---|---|---|---|---|---|---|
| Example 1 | 300 | 500 | 0.60 | A | 2.0 | Absence | 15 |
| Example 2 | 700 | 1000 | 0.70 | A | 0.6 | Absence | 15 |
| Example 3 | 700 | 350 | 2.00 | B(-) | 0.8 | Presence | 15 |
| Example 4 | 300 | 350 | 0.86 | A | 2.0 | Presence | 15 |
| Example 5 | 600 | 600 | 1.00 | A | 1.0 | Absence | 20 |
| Example 6 | 300 | 430 | 0.70 | A | 1.8 | Absence | 30 |
| Example 7 | 600 | 600 | 1.00 | A | 0.9 | Absence | 10 |
| Example 8 | 100 | 1000 | 0.10 | B(+) | 4.0 | Absence | 15 |
| Comparative Example 1 | 1100 | 350 | 3.14 | F(-) | 0.2 | Presence | 20 |

TABLE 1-continued

| | | | | | | | |
|---|---|---|---|---|---|---|---|
| Comparative Example 2 | 100 | 1500 | 0.07 | F(+) | 4.0 | Absence | 30 |

| | Porosity P2 of the air introducing layer [%] | Thickness H1 of the reference electrode [μm] | Thickness H2 of the air introducing layer [μm] | Width W1 of the reference electrode [mm] | Width W2 of the air introducing layer [mm] |
|---|---|---|---|---|---|
| Example 1 | 30 | 15 | 30 | 2.0 | 2.5 |
| Example 2 | 35 | 15 | 30 | 0.8 | 2.5 |
| Example 3 | 40 | 15 | 30 | 0.8 | 2.5 |
| Example 4 | 30 | 15 | 30 | 2.0 | 2.5 |
| Example 5 | 40 | 13 | 25 | 1.0 | 2.0 |
| Example 6 | 20 | 17 | 30 | 2.0 | 2.5 |
| Example 7 | 30 | 15 | 35 | 1.0 | 2.0 |
| Example 8 | 20 | 20 | 25 | 1.5 | 2.0 |
| Comparative Example 1 | 40 | 10 | 25 | 0.2 | 2.0 |
| Comparative Example 2 | 20 | 15 | 20 | 1.5 | 2.0 |

As shown in Table 1, when the ratio R1/R2 is greater than or equal to 0.1 and less than or equal to 2.0, the evaluation is any one of "A", "B(+)", and "B(−)", and the detection accuracy of the NOx concentration is very high or high (Examples 1 to 8). In contrast, when the ratio R1/R2 is less than 0.1, the evaluation is "F(+)", and the amount of oxygen around the reference electrode 42 is excessive (Comparative Example 2). When the ratio R1/R2 is greater than 2.0, the evaluation is "F(−)", and the amount of oxygen around the reference electrode 42 is insufficient (Comparative Example 1). The evaluation is "A" for Examples 1, 2, and 4 to 7. The results indicate that the ratio R1/R2 is preferably greater than or equal to 0.3 and less than or equal to 1.0. It is also indicated that the ratio R1/R2 is more preferably greater than or equal to 0.4.

What is claimed is:

1. A gas sensor for detecting a specific gas concentration in a measurement-object gas, the gas sensor comprising:
a sensor element including:
an element body including an oxygen-ion-conductive solid electrolyte layer, the element body having disposed therein a measurement-object gas flow section that allows the measurement-object gas to be introduced thereinto and to flow therethrough,
a measurement electrode disposed in the measurement-object gas flow section,
a measurement-object-gas-side electrode disposed in or out of the element body so as to come into contact with the measurement-object gas,
a reference electrode disposed within the element body, and
a reference gas introducing section that allows a reference gas to be introduced thereinto and to flow therethrough to the reference electrode, the reference gas being used as a reference to detect the specific gas concentration in the measurement-object gas;
a measurement pump cell and a measurement pump cell controller that is configured to control the measurement pump cell to detect the specific gas concentration in the measurement-object gas on the basis of a voltage between the reference electrode and the measurement electrode, wherein the measurement pump cell includes the measurement electrode and an outer measurement electrode disposed on an outer side of the element body so as to come into contact with the measurement-object gas; and
a reference-gas regulating pump cell and a reference-gas regulating pump cell controller that is configured to control the reference-gas regulating pump cell to allow an oxygen pump-in current to flow between the reference electrode and the measurement-object-gas-side electrode to pump oxygen into around the reference electrode from around the measurement-object-gas-side electrode, wherein the reference-gas regulating pump cell includes the reference electrode and the measurement-object-gas-side electrode, and wherein
a ratio R1/R2 of a reaction resistance R1 of the reference electrode to a diffusion resistance R2 of the reference gas introducing section is greater than or equal to 0.1 and less than or equal to 2.0.

2. The gas sensor according to claim 1, wherein the ratio R1/R2 is greater than or equal to 0.3 and less than or equal to 1.0.

3. The gas sensor according to claim 1, wherein the reaction resistance R1 is greater than or equal to 100Ω and less than or equal to 1000 Ω.

4. The gas sensor according to claim 1, wherein the diffusion resistance R2 is greater than or equal to 300Ω and less than or equal to 1000 Ω.

5. The gas sensor according to claim 1, wherein the reference electrode has an area S1 of greater than or equal to 1.0 mm².

6. The gas sensor according to claim 1, wherein the reference electrode is a porous body having a porosity P1 of greater than or equal to 10% and less than or equal to 25%, and
the reference gas introducing section includes a porous reference gas introducing layer having a porosity P2 of greater than or equal to 20% and less than or equal to 50% and satisfying P1<P2.

7. The gas sensor according to claim 1, wherein the element body has a longitudinal direction,
the reference gas introducing section includes a porous reference gas introducing layer,
a thickness H2 of the reference gas introducing layer is larger than a thickness H1 of the reference electrode, and
a width W2 of the reference gas introducing layer is larger than a width W1 of the reference electrode, the width W1 and the width W2 extending in a width direction that is a direction perpendicular to the longitudinal direction.

8. The gas sensor according to claim 1, wherein the reference gas introducing section includes a porous reference gas introducing layer, the reference electrode has a thickness H1 of greater than or equal to 10 μm and less than or equal to 20 μm, and the reference gas introducing layer has a thickness H2 of greater than or equal to 15 μm and less than or equal to 40 μm.

9. The gas sensor according to claim 1, wherein the element body has a longitudinal direction, the reference gas introducing section includes a porous reference gas introducing layer, and the reference electrode has a width W1 of greater than or equal to 0.6 mm and less than or equal to 2.5 mm, and the reference gas introducing layer has a width W2 of greater than or equal to 1.5 mm and less than or equal to 3.0 mm, the width W1 and the width W2 extending in a width direction that is a direction perpendicular to the longitudinal direction.

10. The gas sensor according to claim 1, wherein the sensor element further includes a measurement voltage detection sensor cell including the reference electrode and the measurement electrode and configured to detect a measurement voltage that is the voltage between the reference electrode and the measurement electrode, and the measurement pump cell controller is configured to control the measurement pump cell on the basis of the measurement voltage so that the measurement voltage becomes a target voltage, obtain a measurement pump current that flows when the measurement pump cell pumps out oxygen, which is produced around the measurement electrode from the specific gas, from around the measurement electrode to around the outer measurement electrode, and detect the specific gas concentration in the measurement-object gas on the basis of the measurement pump current, or control the measurement pump cell so that the measurement pump current becomes a target current, and detects the specific gas concentration in the measurement-object gas on the basis of the measurement voltage.

11. A sensor element for detecting a specific gas concentration in a measurement-object gas, the sensor element comprising:

an element body including an oxygen-ion-conductive solid electrolyte layer, the element body having disposed therein a measurement-object gas flow section that allows the measurement-object gas to be introduced thereinto and to flow therethrough;

a measurement electrode disposed in the measurement-object gas flow section;

a measurement-object-gas-side electrode disposed in or out of the element body so as to come into contact with the measurement-object gas;

a reference electrode disposed within the element body; and a reference gas introducing section that allows a reference gas to be introduced thereinto and to flow therethrough to the reference electrode, the reference gas being used as a reference to detect the specific gas concentration in the measurement-object gas, wherein a ratio R1/R2 of a reaction resistance R1 of the reference electrode to a diffusion resistance R2 of the reference gas introducing section is greater than or equal to 0.1 and less than or equal to 2.0.

* * * * *